US010400828B2

(12) United States Patent
Huber et al.

(10) Patent No.: US 10,400,828 B2
(45) Date of Patent: Sep. 3, 2019

(54) THREAD-REINFORCED JOINT DEVICE AND COUPLING DEVICE FOR A VEHICLE DRIVE

(71) Applicant: Siemens Aktiengesellschaft, München (DE)

(72) Inventors: Armin Huber, Schoenberg (DE); Marc Brandl, Burgkirchen (DE); Johann Loew, Peterskirchen (DE); Roland Liessel, Waldkraiburg (DE); Wolfgang Orthofer, Ampfing (DE); Josef Eberler, Neumarkt in der Oberpfalz (DE); Klaus Joos, Nürnberg (DE)

(73) Assignee: Siemens Mobility GmbH, München (DE)

( * ) Notice: Subject to any disclaimer, the term of this patent is extended or adjusted under 35 U.S.C. 154(b) by 256 days.

(21) Appl. No.: 15/514,281

(22) PCT Filed: Sep. 15, 2015

(86) PCT No.: PCT/EP2015/071057
§ 371 (c)(1),
(2) Date: Mar. 24, 2017

(87) PCT Pub. No.: WO2016/046020
PCT Pub. Date: Mar. 31, 2016

(65) Prior Publication Data
US 2017/0292572 A1    Oct. 12, 2017

(30) Foreign Application Priority Data
Sep. 25, 2014  (DE) .......................... 10 2014 014 493

(51) Int. Cl.
*F16D 3/62*    (2006.01)
*B61C 9/44*    (2006.01)
(Continued)

(52) U.S. Cl.
CPC .................. *F16D 3/62* (2013.01); *B61C 9/44* (2013.01); *B61C 9/52* (2013.01); *B61F 3/04* (2013.01); *B61F 5/52* (2013.01); *F16D 3/78* (2013.01)

(58) Field of Classification Search
CPC ...... F16D 3/62; F16D 3/78; B61F 5/52; B61F 3/04; B61C 9/52; B61C 9/44
See application file for complete search history.

(56) References Cited

U.S. PATENT DOCUMENTS 3,602,153 A * 8/1971 Korn .......................... B61C 9/44
 105/131
3,859,929 A * 1/1975 Korn .......................... B61C 9/44
 105/117
(Continued)

FOREIGN PATENT DOCUMENTS

AT   246225 B   4/1966
BE   456 594 A   8/1944
(Continued)

*Primary Examiner* — Darlene P Condra
(74) *Attorney, Agent, or Firm* — Henry M. Feiereisen LLC

(57) ABSTRACT

A thread-reinforced joint device for a coupling device of a vehicle drive, particularly of a low-platform vehicle, includes a plurality of coupling elements, at least one thread packet coupling two adjacent coupling elements so that a force is transmittable, a support device arranged on at least one of the coupling elements for axially guiding the at least one thread packet and at least one elastic body, into which, the at least one thread packet and the coupling elements are at least partially embedded. The coupling elements are designed and/or can be positioned so that the thread-reinforced joint device is adaptable to different mounting interfaces of a respective coupling device.

25 Claims, 20 Drawing Sheets

(51) Int. Cl.
 *F16D 3/78* (2006.01)
 *B61C 9/52* (2006.01)
 *B61F 3/04* (2006.01)
 *B61F 5/52* (2006.01)

(56) References Cited

U.S. PATENT DOCUMENTS

| | | | |
|---|---|---|---|
| 4,790,248 A | 12/1988 | Piepenbreier et al. | |
| 5,507,692 A * | 4/1996 | Chivari | F16D 3/60 464/147 |
| 6,315,670 B1 * | 11/2001 | Andra | F16D 3/78 464/69 |
| 2007/0080534 A1 * | 4/2007 | Rothe | F16D 3/50 285/222.1 |
| 2008/0261705 A1 * | 10/2008 | Wahling | F16D 3/78 464/87 |
| 2011/0092296 A1 | 4/2011 | Rothe et al. | |
| 2011/0300953 A1 | 12/2011 | Waehling et al. | |
| 2012/0094774 A1 * | 4/2012 | Brandl | F16D 3/78 464/85 |
| 2014/0128167 A1 | 5/2014 | Scheper et al. | |
| 2015/0037086 A1 | 2/2015 | Brandl et al. | |

FOREIGN PATENT DOCUMENTS

| | | |
|---|---|---|
| CN | 103547825 A | 1/2014 |
| DE | 196 39 304 A1 | 3/1996 |
| DE | 20 2013 010 525 U1 | 12/2013 |
| DE | 20 2015 003 886 U1 | 6/2015 |
| EP | 2 626 580 A2 | 8/2013 |
| FR | 2 234 166 A1 | 1/1975 |
| FR | 2 353 751 A1 | 12/1977 |
| JP | H11325101 A | 11/1999 |
| RU | 1838167 A3 | 8/1993 |
| WO | WO 9629224 A1 | 9/1996 |
| WO | WO 2009-149957 A1 | 12/2009 |
| WO | WO 2012119714 A1 | 9/2012 |

* cited by examiner

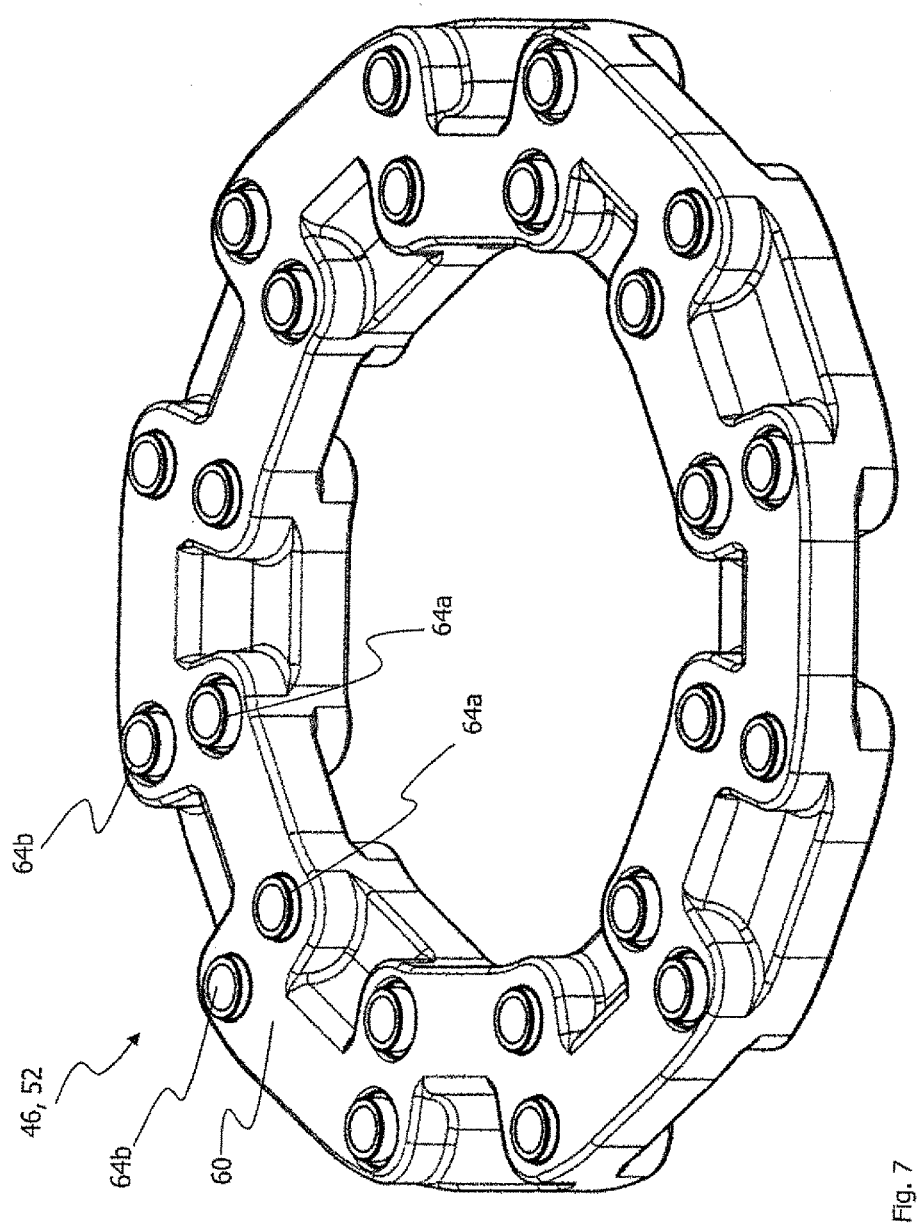

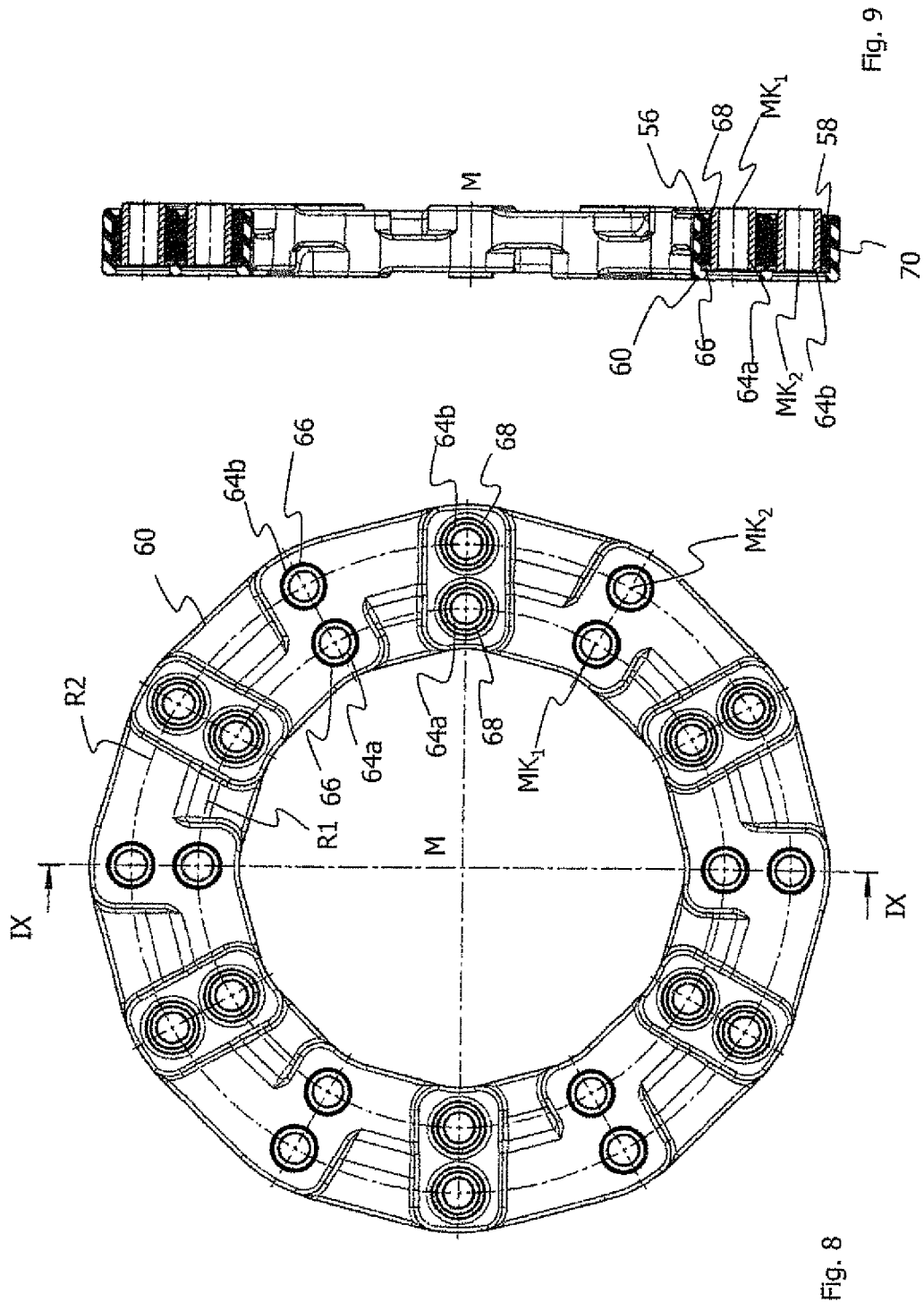

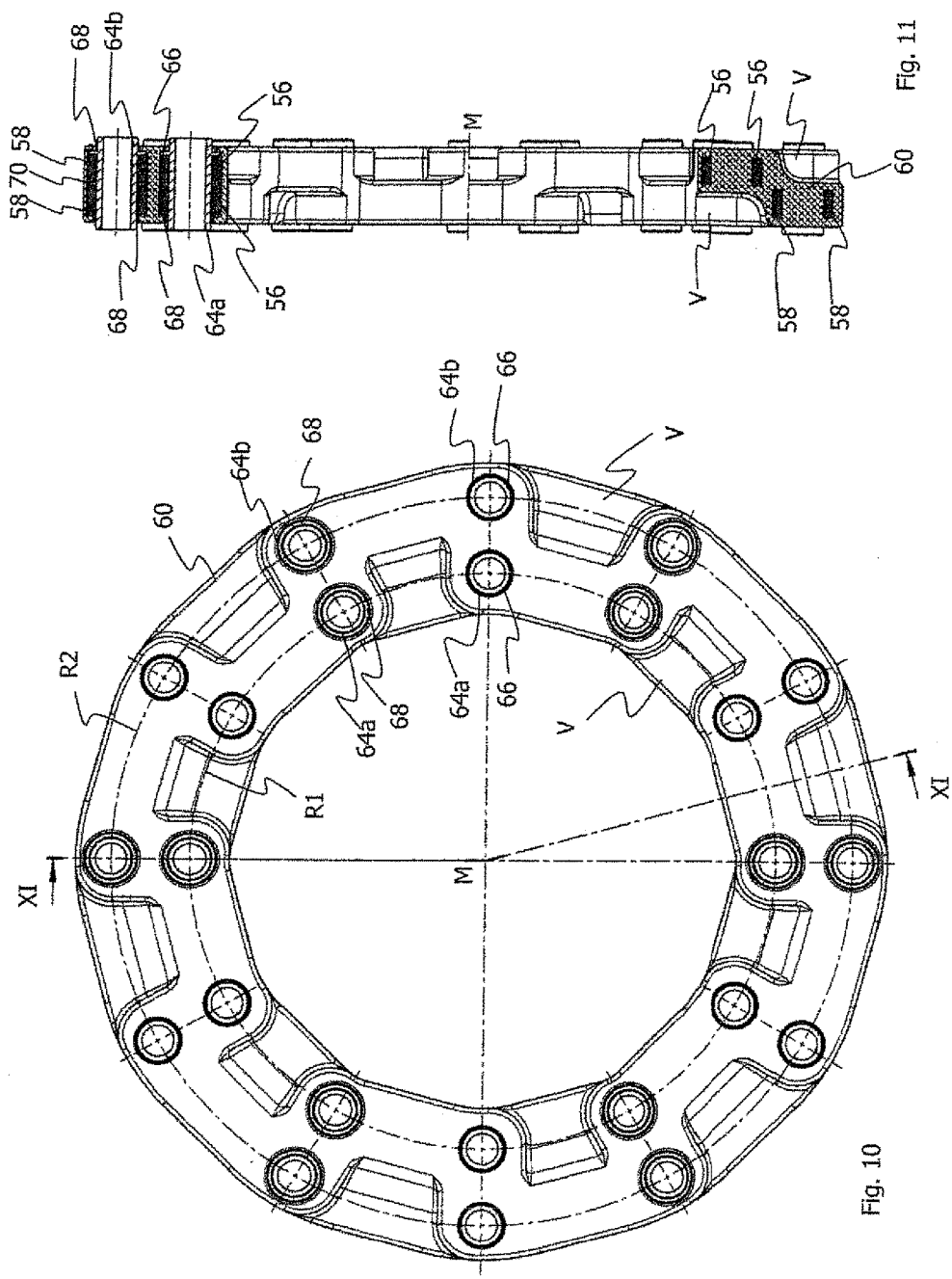

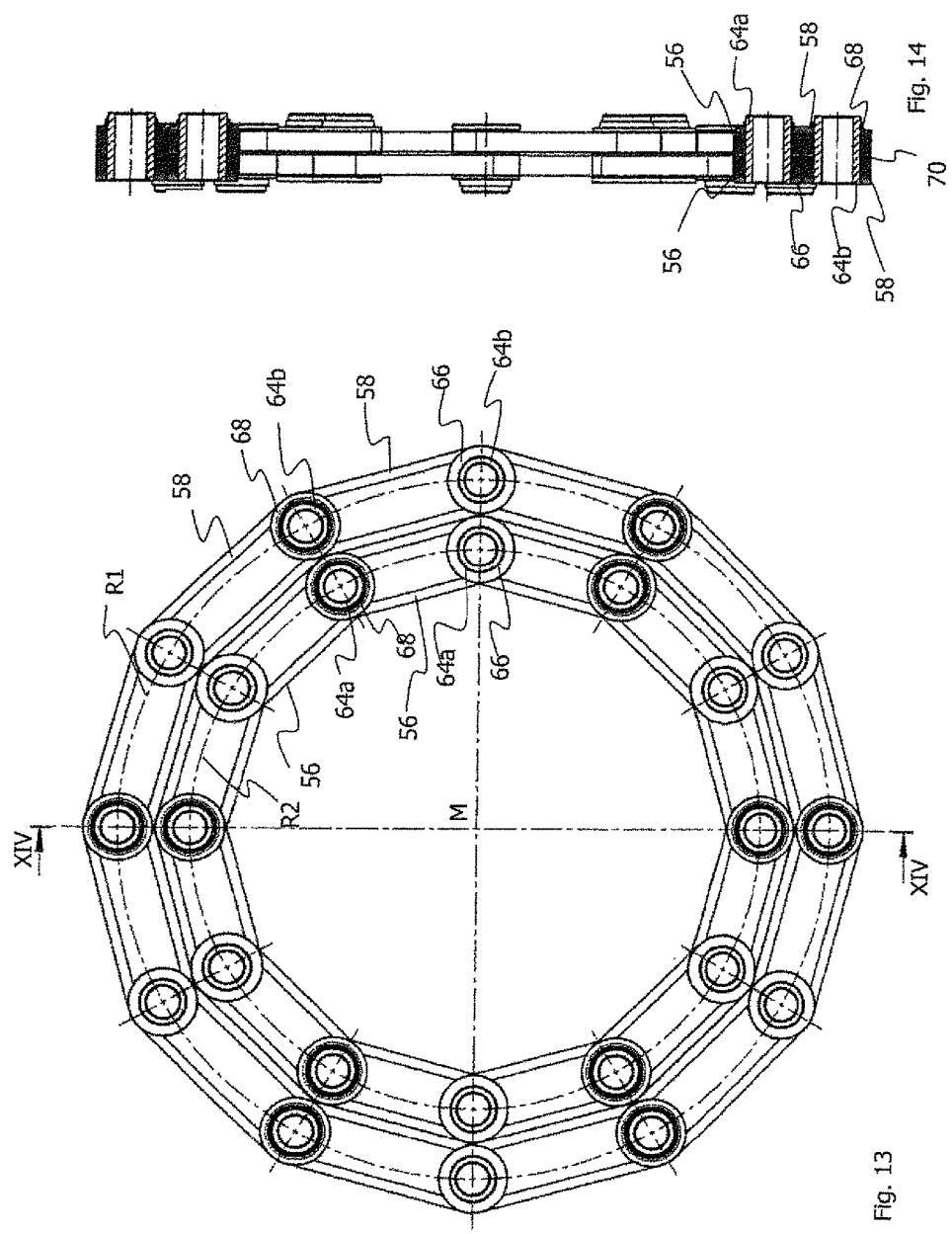

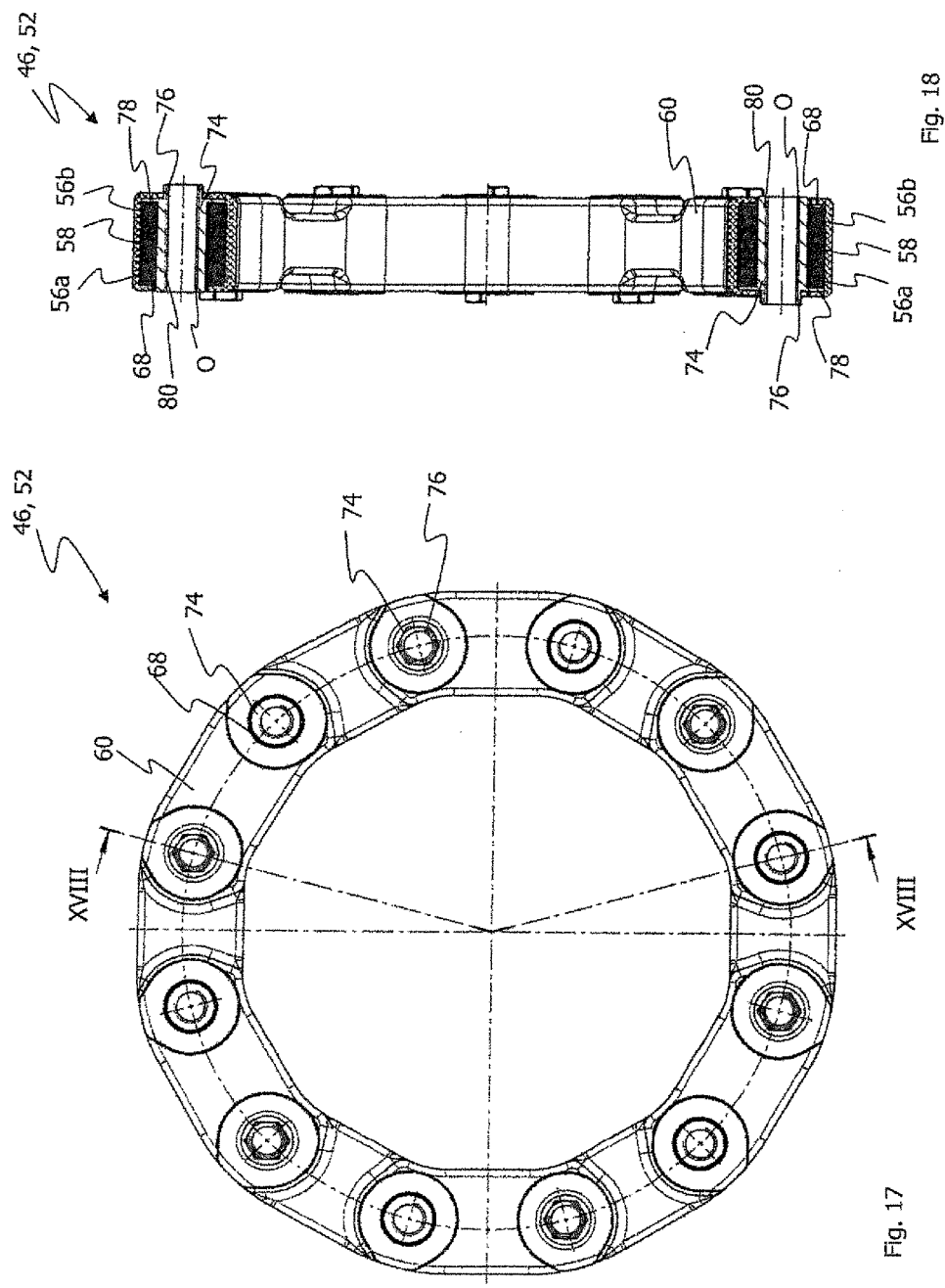

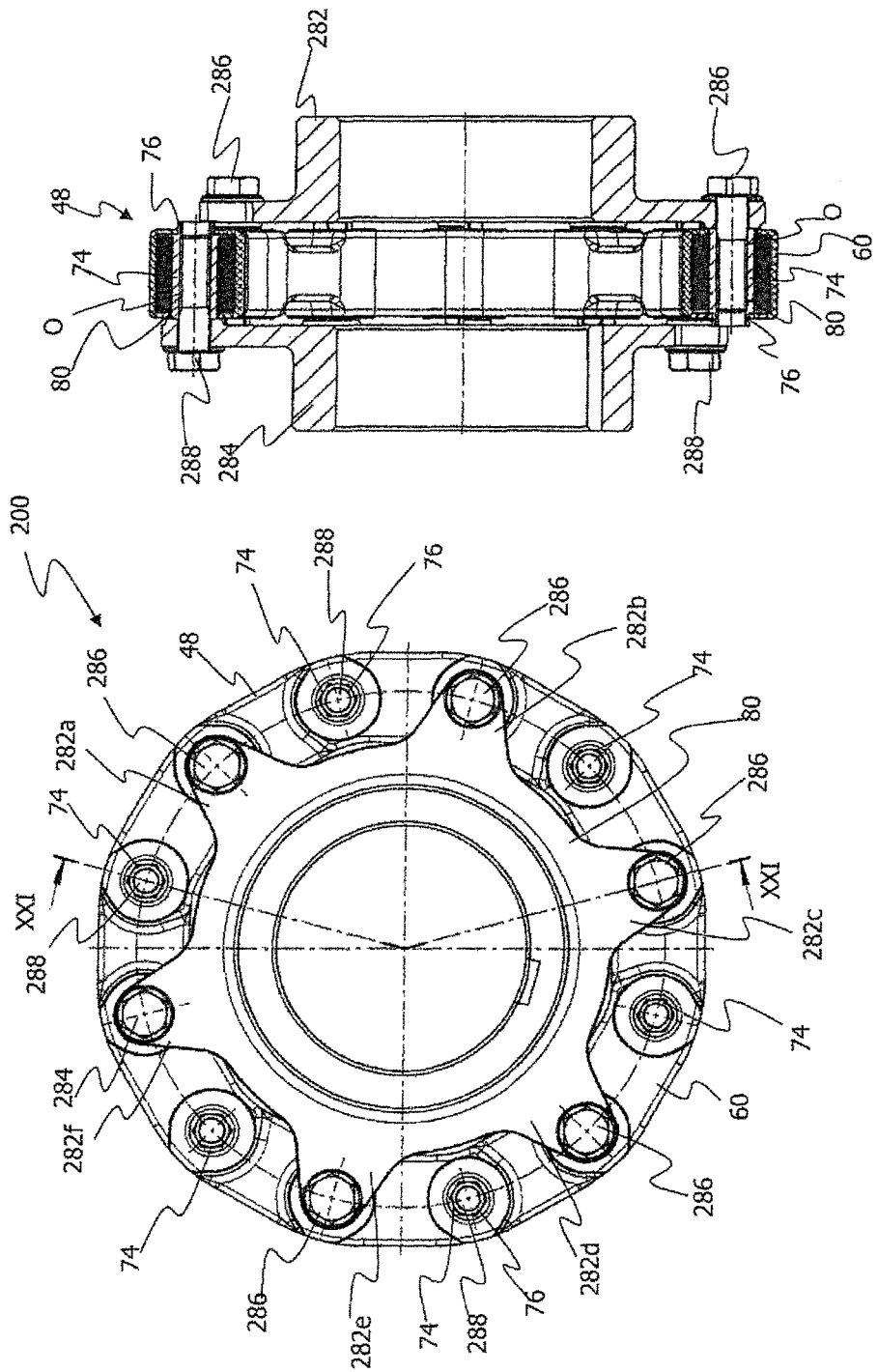

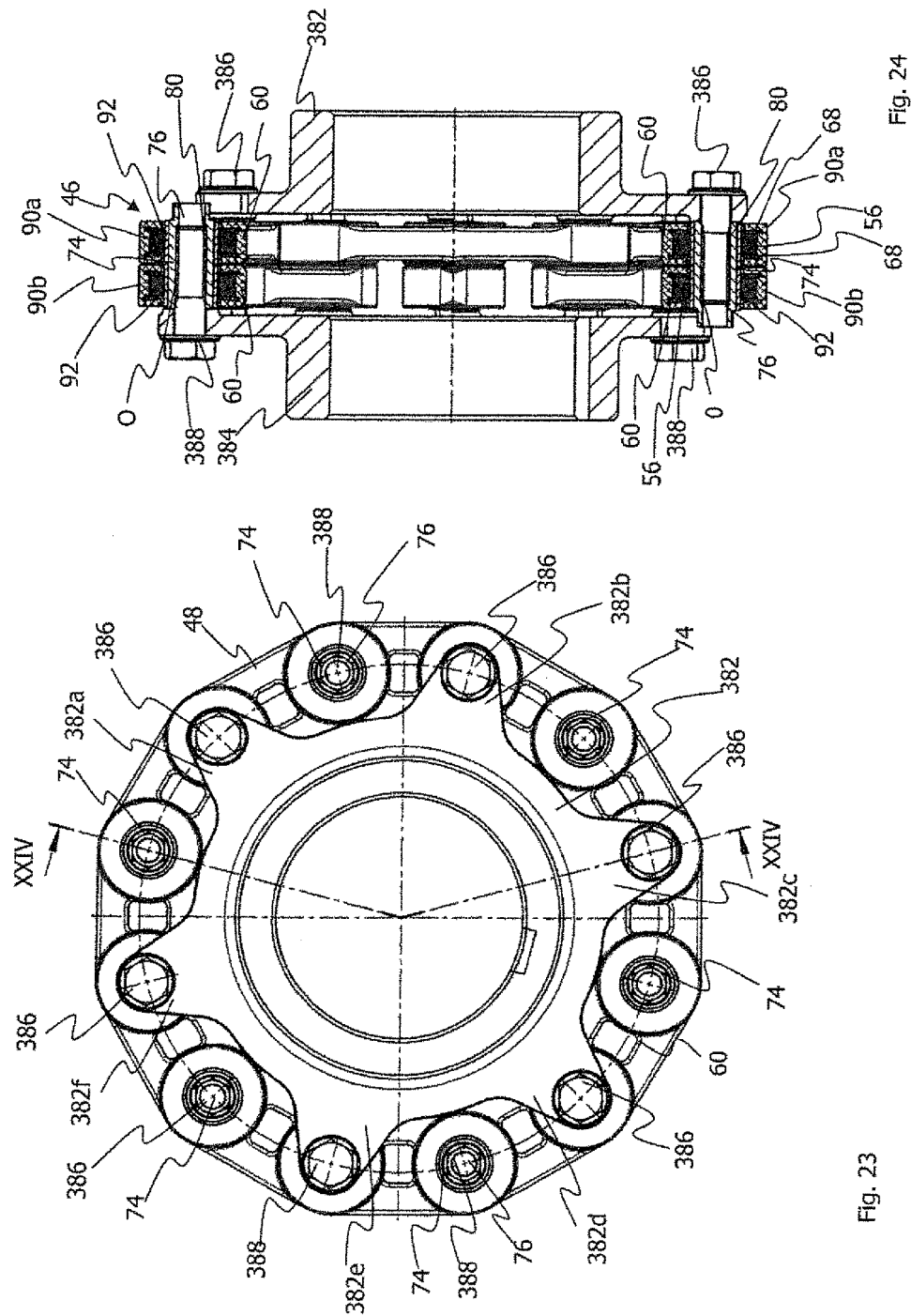

THREAD-REINFORCED JOINT DEVICE AND COUPLING DEVICE FOR A VEHICLE DRIVE

CROSS-REFERENCES TO RELATED APPLICATIONS

This application is the U.S. National Stage of International Application No. PCT/EP2015/071057, filed Sep. 15, 2015, which designated the United States and has been published as International Publication No. WO 2016/046020 A1, which claims the priority of German Patent Application, Serial No. 10 2014 014 493.3, filed Sep. 25, 2014, pursuant to 35 U.S.C. 119(a)-(d).

BACKGROUND OF THE INVENTION

The present invention relates to a thread-reinforced joint device and a coupling device for a vehicle drive, in particular for the drive of a low-platform vehicle.

Low-platform vehicles should generally be understood to be vehicles with low-lying floors in the interior. Such floors should primarily serve to enable barrier-free utilization of the interior of the low-platform vehicle, i.e. barrier-free boarding and alighting of passengers. With low-platform vehicles, the interior platforms, i.e. the interior floors, lie below the top edge of the wheels. In the case of rail vehicles, the height of the floor in the interior can be even lower and, for example, be only slightly higher than half the diameter of the wheel. In the case of street cars, the floor height can even be significantly lower than half the diameter of the wheel.

Known from the prior art are coupling devices as claimed in document DE 196 39 304 A1. This document discloses an elastic joint coupling with an intermediate ring arranged between two coupling flanges made up of single metal elements distributed around the circumference and vulcanized into rubber blocks. The metal elements are screwed alternately to the coupling flanges. In the circumferential direction, the metal elements of the intermediate ring are evenly distributed wedges extending in the radial direction across the entire ring width. The rubber blocks are vulcanized between the wedges and held under compressive prestress in the circumferential direction when installed.

This joint coupling known from the prior art is relatively complicated to assemble since the rubber blocks have to be radially prestressed in order to be able to establish compressive prestress of the rubber blocks in the circumferential direction.

SUMMARY OF THE INVENTION

It is an object of the present invention to provide a thread-reinforced joint device and a coupling device that is low-maintenance and simple to assemble and acoustic decoupling of the units to be connected.

According to one aspect of the invention, the object is achieved with a thread-reinforced joint device for a coupling device of a vehicle drive, in particular a low-platform vehicle, including a plurality of coupling elements and at least one thread packet. The at least one thread packet couples adjacent coupling elements such that force may be transmitted. A support device arranged on at least one coupling element arranged guides the at least one thread packet axially. The at least one thread packet, the coupling elements and the support device are at least partially embedded in at least one elastic body. The coupling elements are designed and/or can be positioned such that the thread-reinforced joint device is adaptable to different mounting interfaces of a coupling device.

Further embodiments of the invention are disclosed in the attached dependent claims.

The thread-reinforced joint devices according to the invention facilitate simplified assembly. It is no longer necessary, as in the prior art, for the rubber blocks to be assembled in the circumferential direction under compressive prestress or radially prestressed. This greatly simplifies and expedites assembly. Moreover, the thread-reinforced joint device requires lower assembly forces. One reason for this is that, unlike the prior art, at the time of assembly, the thread-reinforced joint device does not have to take account of and compensate any incompletely established relaxation of the rubber blocks.

Since the joint devices according to the invention are thread-reinforced, they have a higher power density compared to the prior art. The thread reinforcement of the joint devices results in increased tensile strength so that, with the same strength rating, much less installation space is required for the thread-reinforced joint device and hence a coupling device overall.

The design and/or positioning of its coupling elements enables the thread-reinforced joint devices according to the invention to be adapted to different mounting interfaces of a coupling device. In this context, mounting interfaces can be understood to be predetermined hole patterns, predetermined screw patterns, predetermined hole-circle diameters for drive and output or predetermined types of mounting and mounting positions.

The at least one thread packet can consist of individual threads or a plurality of individual threads wound in a clip shape. A thread packet can encircle a driven and an output coupling element and in this way transmit forces and also torques between these two coupling elements. The coupling elements can, for example, be cylinder bushings or similar elements. The coupling elements can in turn be connected, for example, by bolts, screws or similar connecting elements, to a flange or also directly to a wheel of a vehicle.

In addition to the absorption of tensile forces, the at least one elastic body is in particular also used to absorb compressive forces, which may occur during the operation of the thread-reinforced joint device during force or torque transmission. The thread reinforcement by the at least one thread packet limits the tensile stresses in the at least one elastic body. This further reduces the relaxation phenomena in the at least one elastic body. The at least one elastic body can, for example, be made of an elastomer, a thermoplastic elastomer, a polymer or rubber.

According to one embodiment of the invention, the at least one coupling element can comprise a screw-thread. The screw-thread can be an internal screw-thread. The thread-reinforced joint device can be screwed directly to a flange of a coupling device or the like since the connecting screws can be screwed directly and immediately into the at least one coupling element of the thread-reinforced joint device. This, for example, enables a lock nut to be dispensed with thus saving installation space. Moreover, the thread-reinforced joint device with the at least one coupling element comprising a screw-thread can be screwed to prefabricated or predetermined mounting flanges without the mounting interface on the flange having to be changed or adapted.

The at least one coupling element can comprise a segment with at least one predetermined screw head. If the at least one coupling element comprises a screw-thread, under certain circumstances, when screwing a screw into the coupling element, it can be necessary to counterhold the coupling element. For example, it is necessary to prevent a torque being transferred to the thread-reinforced joint device or to the at least one elastic body or the thread packet during the screwing process. For this reason, it is possible for a screw head to be provided on the at least one coupling element for counterholding. The predetermined screw head can, for example, be a hexagon. It is also conceivable for individual coupling elements to be connected to one another so as to be mutually supportive during the screwing process. For example, the coupling elements can be connected to one another by a plate or the like. The plate can be designed to prevent co-rotation of coupling elements during the screwing process.

The at least one coupling element can comprise a segment functioning as a shoulder element. This segment is used to secure the thread packet on the coupling element. The segment functioning as a shoulder element can interact with a shoulder element which is connected to the coupling element after the attachment of the thread packet. The shoulder element can be provided on an axial end of the coupling element opposite to the segment serving as a shoulder element.

According to one embodiment, the at least one coupling element is received in a bushing.

At least one first group of coupling elements can be arranged on a first radius. At least one second group of coupling elements can be arranged on a second radius. In this case, the first radius can differ from the second radius. According to this embodiment, the thread-reinforced joint device can be adapted to different mounting hole circles. For example, a flange with a first hole circle and a flange with a second hole circle can be coupled to one another by means of the thread-reinforced joint device. In other words, the first radius can be assigned to a flange, for example the drive flange, and the second radius, for example the output flange. However, it is also conceivable for driven and output coupling elements to be provided on both the first radius and the second radius. This enables, for example, two radial mounting circles and torque transmission chains offset with respect to one another to be provided.

According to one embodiment, the coupling elements of the first group and the coupling elements of the second group can be arranged alternately in the circumferential direction of the thread-reinforced joint device.

Moreover, the coupling elements of the first group and the coupling elements of the second group can be in alignment in the radial direction.

A coupling element of the first group and a coupling element of the second group can be connected to one another by at least one thread packet.

According to one development of the invention, the coupling elements of the first group can be coupled to one another by a first group of thread packets and the coupling elements of a second group can be coupled to one another by a second group of thread packets. Both the coupling element on the first radius and the coupling elements on the second radius can be connected alternately to a driven flange and an output flange.

According to one embodiment, the thread-reinforced joint device can comprise a plurality of elastic bodies, i.e. the thread-reinforced joint device can be modular or in several parts. The elastic bodies or coupling elements can each comprise at least one thread packet. With this embodiment, the thread-reinforced joint device is made up of a plurality of separate elastic bodies or coupling elements, which can be coupled to one another. In other words, a plurality of elastic bodies can be connected to one another in order to form the thread-reinforced joint device and to be able to transmit torques. The thread reinforcement limits the tensile stresses in the at least one elastic body. This further reduces the relaxation phenomena in the at least one elastic body.

Moreover, the thread-reinforced joint device can comprise a plurality of clip-shaped thread packets. In this case, the clip-shaped thread packets can be arranged in a ring shape and each connected to one another by at least one coupling element. A coupling element can, for example, be encircled by two clip-shaped thread packets, wherein in each case one of the thread packets is subjected to tensile stress and the other to compressive stress.

According to one aspect of the invention, the object is achieved with a coupling device for a vehicle drive, in particular for the drive of a low-platform vehicle, including at least one first flange, which can be coupled to a gear unit, at least one second flange, which is coupled to the at least one first flange and at least one third flange, which is connected to the at least one second flange by least one shaft segment and which can be coupled to at least one wheel of the vehicle to be driven. The at least one shaft segment extends through the at least one first flange. The at least one first flange and the at least one second flange are coupled by at least one first thread-reinforced joint device and at least one second thread-reinforced joint device is arranged on the at least one third flange.

According to one embodiment, the at least one shaft segment can be a hollow-shaft segment.

According to one embodiment, the at least one first flange can comprise an aperture. The at least one shaft segment can extend through the aperture of the at least one first flange.

The at least one shaft segment can comprise a gear tooth system, which engages in a corresponding gear tooth system on the at least one second flange. A torque can be transmitted from the at least one second flange to the at least one shaft segment by the gear tooth system between the at least one shaft segment and the at least one second flange.

According to one development, the at least one third flange can be formed in one piece with the at least one shaft segment.

The at least one first and the at least one second thread-reinforced joint device can, for example, be embodied in the form of an elastic flexible disk. A flexible disk of this kind can comprise a plurality of coupling elements arranged in the circumferential direction at predetermined angular distances with respect to a center axis of the joint device, a plurality of thread packets, wherein each thread packet is in each case encircled two adjacent coupling elements and each coupling element is encircled by at least two thread packets, a support device arranged on at least one of the coupling elements for the purpose of axially guiding the plurality of thread packets, and an elastic sheathing in which the thread packets, the support devices and the coupling elements are at least partially embedded. The support device can at comprise least two shoulder elements embodied separately from one another and which can be attached to one of the coupling elements.

Moreover, the at least one first and the at least one second joint device can be formed from a plurality of coupling elements coupled to one another. The coupling elements can be clip-shaped. Each coupling element comprises an elastic body in which the at least one thread packet encircling at least two coupling elements is embedded.

The coupling devices according to the invention can be used in vehicles, in particular in low-platform vehicles, with wheel sets and idler gears. In the case of a vehicle with wheel sets, one coupling per wheel set is provided on only one vehicle side, since a wheel-set shaft transmits the torque to the other vehicle side.

The present invention further relates to a drive arrangement for a vehicle, in particular a low-platform vehicle. The drive arrangement comprises at least one motor, which is coupled to at least one gear unit. The at least one gear unit is assigned to at least one vehicle wheel to be driven. At least one coupling device of the type described above is arranged between the at least one gear unit and the at least one vehicle wheel.

Hence, the coupling device of the type described above connects the gear unit to the vehicle wheel to be driven. The coupling device serves inter alia to compensate relative movements that could occur between the motor mounted on a vehicle frame or, in the case of a rail vehicle, on a bogie with the gear unit and the wheel of the vehicle to be driven. In order to be able to reduce the unsprung masses on the wheel of the vehicle, the motor and the gear unit are attached or mounted elastically on a vehicle frame or a bogie. This elastic mounting of the motor and the gear unit can result in the aforementioned relative movements between the vehicle wheel and the motor, which can be compensated by the coupling device or the thread-reinforced joint devices thereof.

The second thread-reinforced joint device can be attached directly to the vehicle wheel. Moreover, it is also possible for a segment of the axle to be provided which can be used to connect the vehicle wheel to the second thread-reinforced coupling. Corresponding apertures are formed on the wheel or on the axle segment which are used for screwing the second thread-reinforced joint device to the wheel or to the axle segment.

According to one development of the invention, the at least one vehicle wheel can be coupled to the at least one second thread-reinforced joint device of the coupling device. It is moreover possible according to the invention for the at least one second joint device to be coupled to an axle of the vehicle wheel to be driven.

The at least one first flange of the coupling device can comprise at least one gear tooth system. The at least one gear tooth system of the first flange can be coupled to at least one gear tooth system on a shaft segment of the at least one gear unit.

The present invention further relates to a low-platform vehicle with at least one drive arrangement of the type described above.

BRIEF DESCRIPTION OF THE DRAWINGS

The following describes an exemplary embodiment of the present invention with reference to the attached figures, wherein:

FIG. 7 shows a further perspective view of the thread-reinforced joint device according to the first embodiment of the invention;

FIG. 8 shows a front view of the thread-reinforced joint device according to the first embodiment of the invention;

FIG. 9 shows a sectional view along the line of intersection IX-IX in FIG. 8;

FIG. 10 shows a front view of the thread-reinforced joint device according to the first embodiment of the invention;

FIG. 11 shows a sectional view along the line of intersection XI-XI in FIG. 10;

FIG. 13 shows a front view of the basic body of the thread-reinforced joint device in FIG. 12;

FIG. 14 shows a sectional view along the line of intersection XIV-XIV in FIG. 13;

FIG. 17 shows a top view of the thread-reinforced joint device according to the second embodiment of the invention;

FIG. 18 shows a sectional view along the line of intersection XVIII-XVIII in FIG. 17;

FIG. 20 shows a top view of the coupling device in FIG. 19;

FIG. 21 shows a sectional view along the line of intersection XXI-XXI in FIG. 20;

FIG. 23 shows a top view of the coupling device in FIG. 22;

FIG. 24 shows a sectional view along the line of intersection XXIV-XXIV in FIG. 23;

DETAILED DESCRIPTION OF THE EMBODIMENTS

Figure 1:
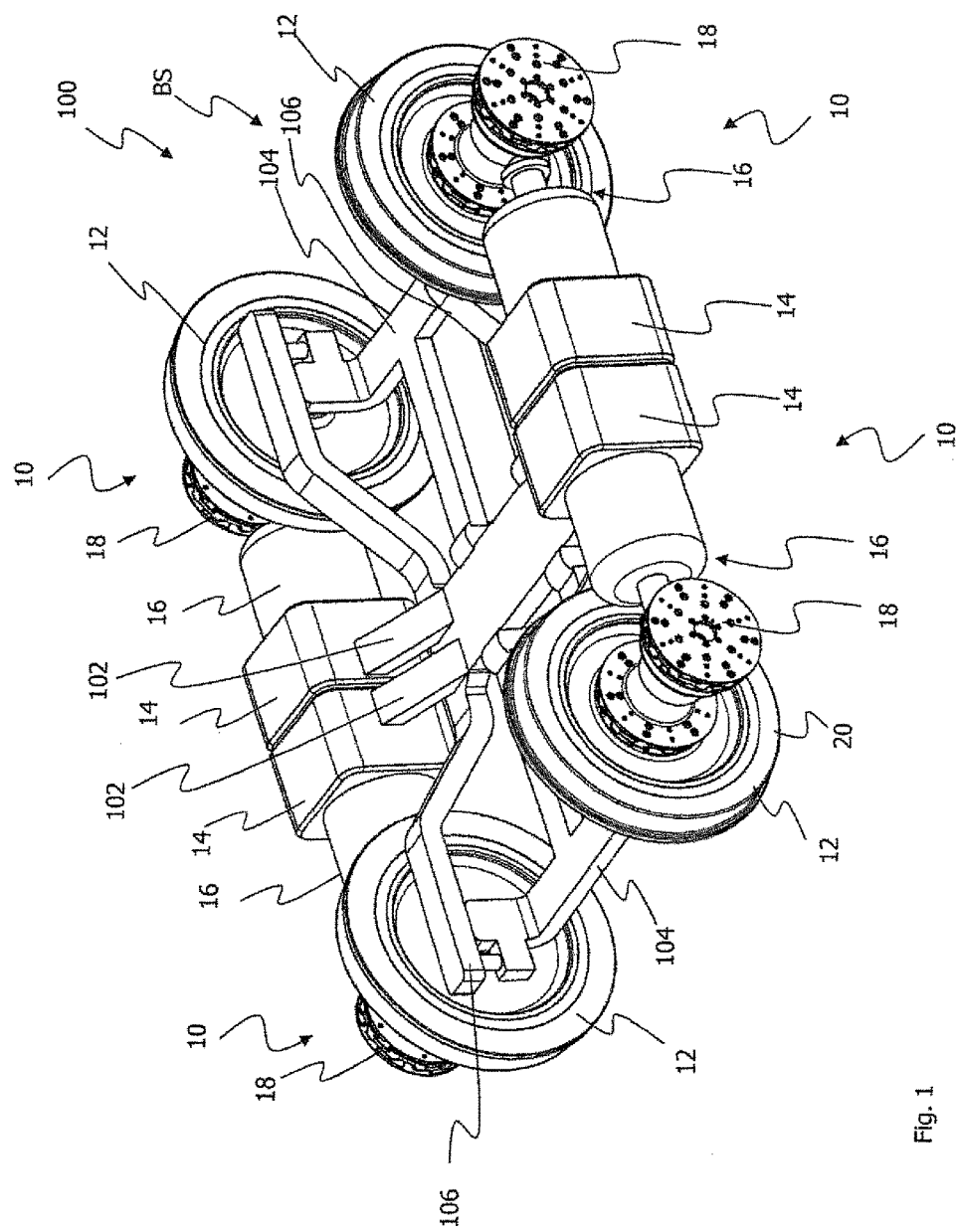
FIG. 1 shows a perspective view of a drive arrangement according to one embodiment of the invention.

FIG. 1 shows a perspective view of a part of a chassis 100 of a rail vehicle. The chassis can for example be a bogie of a rail vehicle. Four drive arrangements 10 are arranged on the bogie 100.

Each drive arrangement 10 is assigned to a rail vehicle wheel 12 and comprises a motor 14, a gear unit 16 and a coupling device 18. The coupling device 18 is connected to the rail vehicle wheel 12. The coupling device 18 is arranged on the side 20 of the rail vehicle wheel facing away from the chassis 100. The coupling device 18 is directly connected to the rail vehicle wheel 12. The coupling device 18 is provided between the gear unit 16 and the rail vehicle wheel 12 and hence arranged on the output side. In this case, both the motor 14 and the gear unit 16 are sprung. Consequently, both contribute to the sprung mass. Such a case is also called a fully sprung system.

The motors 14 are attached to the chassis 100 by connecting elements 102. The rail vehicle wheels 12 are connected to cross members 104 and longitudinal members 106 of the chassis 100. The drive arrangements 10 are arranged outside a region BS of the chassis 100 enclosed between the rail vehicle wheels 12. The region BS is defined by the cross members 104 and the longitudinal members 106 of the chassis 100. Segments of the cross members 104 and the longitudinal members 106 extend partially below the axles of the wheels 12. This is characteristic of low-platform vehicles. This enables the interior vehicle floors to be arranged below the wheel axles or in the region of the wheel axles.

Figure 2:
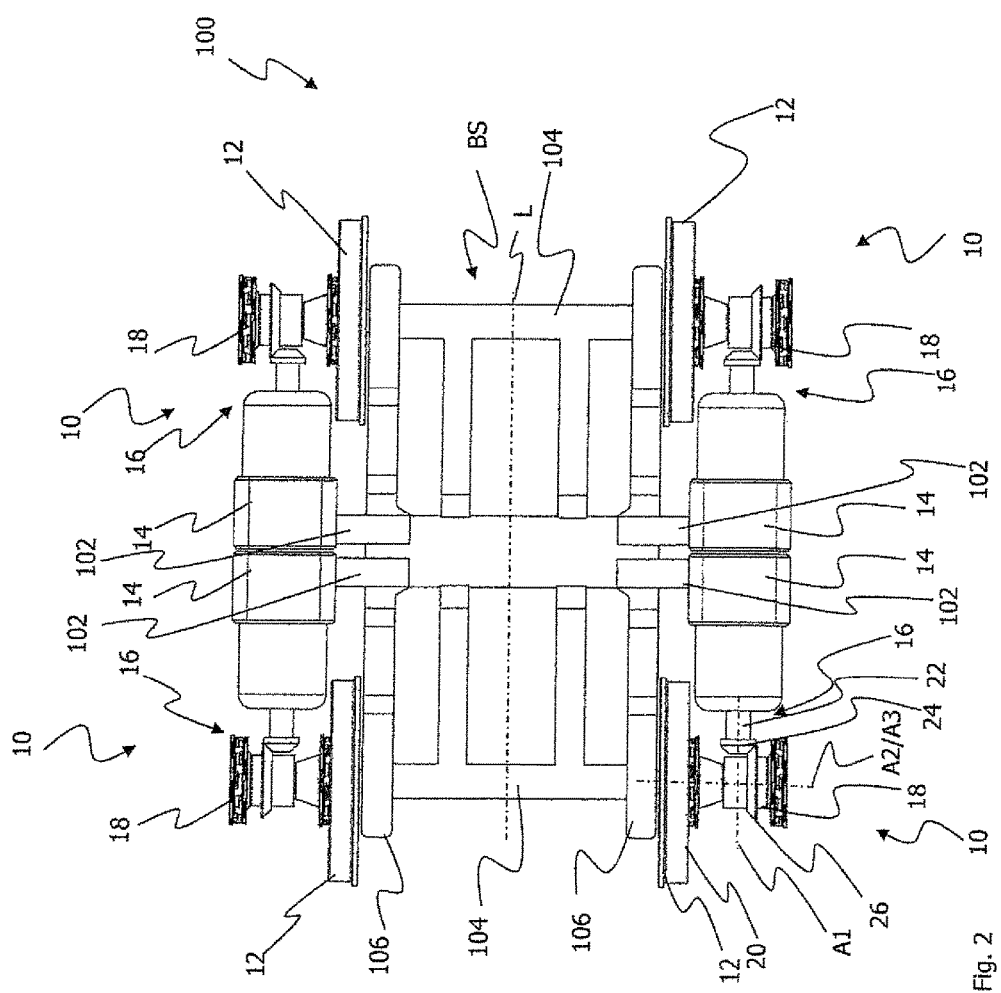
FIG. 2 shows a top view of the drive arrangement according to the embodiment of the invention.

FIG. 2 shows a top view of the bogie or chassis 100 with the drive arrangements 10 arranged thereupon. The drive arrangements 10 each comprise a motor 14, a gear unit 16 and the coupling device 18. The drive arrangements 10 are provided outside the region BS defined by the members 104 and 106 on the outer side 20 of the rail vehicle wheels 12.

The gear unit 16 can, for example, be a bevel gear in which a drive shaft 22 comprises a pinion 24 which drives a ring gear 26. The axis AI of the shaft 22 and the axis A2 of the ring gear 24 extend perpendicular to one another, i.e. the axes AI and A2 intersect. The axis A2 conforms with the axis A3 of the coupling device 18 or the rail vehicle wheel 12. Correspondingly, the axis A3 of the coupling device 18 and the axis AI of shaft 22 of the gear unit 16 also intersect.

The axis AI extends parallel to the longitudinal axis L of the chassis 100. The axis A3 of the coupling device 18 extends transverse to the longitudinal axis L of the chassis 100.

Figure 3:
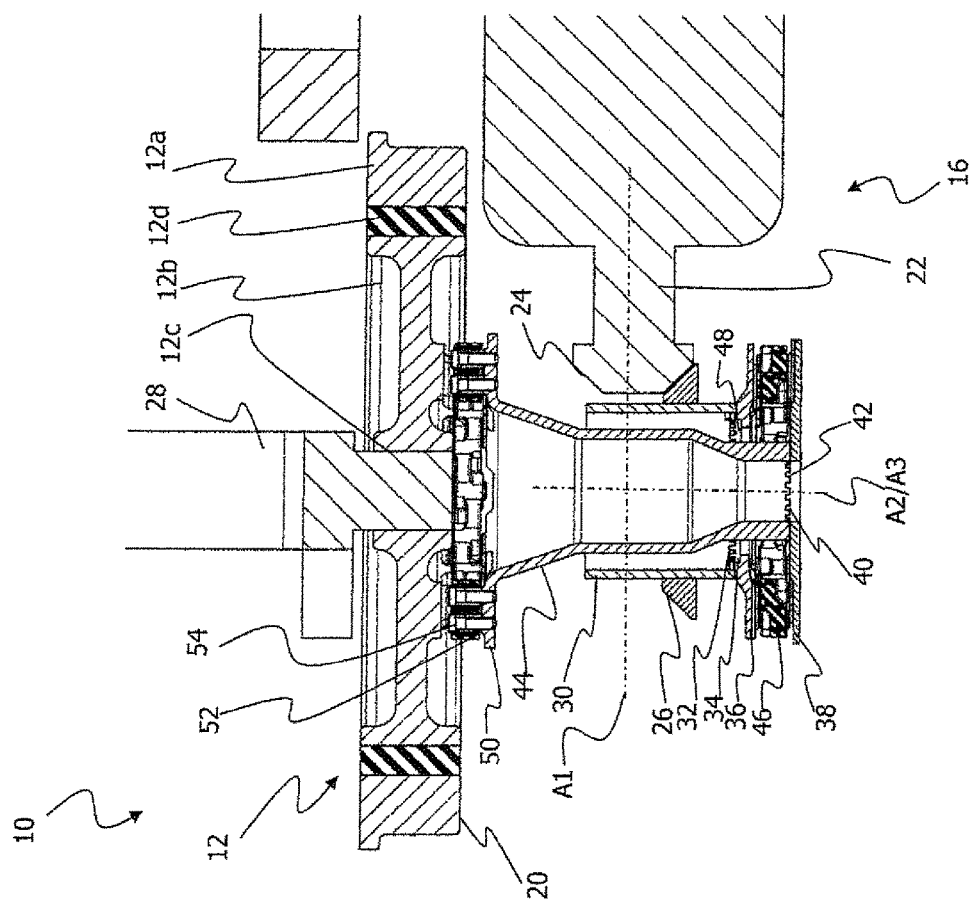
FIG. 3 shows a sectional view of the drive arrangement.

FIG. 3 shows a sectional view of the drive arrangement 10 in which it is possible to identify the gear unit 16, the coupling device 18 and the rail vehicle wheel 12 with its axle 28.

The ring gear 26 of the gear unit 16 is non-rotatably connected to a hollow-shaft segment 30. The shaft segment 30 comprises a gear tooth system 32. The gear tooth system 32 is in engagement with a corresponding gear tooth system 34 of the first flange 36. A second flange 38 comprises a gear tooth system 40 which engages in a corresponding gear tooth system 42 of a hollow-shaft segment 44. A first thread-reinforced joint device 46 is provided between the first flange 36 and the second flange 38. According to this embodiment, the thread-reinforced joint device 46 is embodied in the form of an elastic flexible disk. The hollow-shaft segment 44 extends through an aperture 48 of the first flange 36 in the direction of the rail vehicle wheel 12. On the hollow-shaft segment 44, there is a third flange 50 on which a second thread-reinforced joint device 52 is arranged. The thread-reinforced joint device 52 is screwed to the third flange 50 by means of screws 54. The second thread-reinforced joint device 52 is also embodied as an elastic flexible disk. The second thread-reinforced joint device 52 is connected to the rail vehicle wheel 12 and drives said wheel.

The rail vehicle wheel 12 comprises a tire 12a and a hub 12b with an aperture 12c for receiving the axle 28. An elastic rubber track 12d is provided between the hub 12b and the tire 12a.

The torque is transmitted from the motor 14 to the gear unit 16. The torque is transmitted from the gear unit 16 via the hollow-shaft segment 30 to the first flange 36. The torque is forwarded from the first flange 36 via the first thread-reinforced joint device 46 to the second flange 38 and hence to the hollow-shaft segment 44. The hollow-shaft segment 44 transmits the torque to the third flange 50, which is connected to the second thread-reinforced joint device 52. The second thread-reinforced joint device 52 transmits the torque to the wheel 12 and hence drives said wheel.

Figure 4:
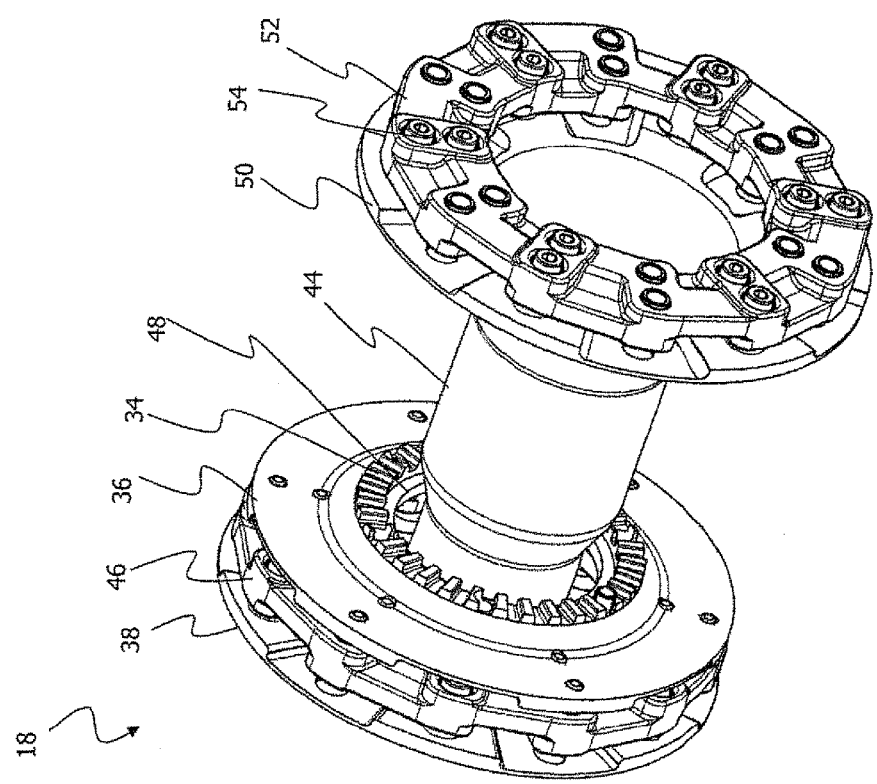
FIG. 4 shows a perspective view of a coupling device according to the invention.

FIG. 4 shows a perspective view of the coupling device 18.

The first flange 36 comprises the gear tooth system 34, which, as shown in FIG. 3, serves for connection to the gear unit 16 or the hollow-shaft segment 30 (not shown) of the gear unit 16. The first flange 36 is connected to the second flange 38 by the first thread-reinforced joint device or flexible disk 46. The flange 36 and 38 can be screwed to the flexible disk 46. The second flange 38 is connected to the hollow-shaft segment 44. The hollow-shaft segment 44 extends through the aperture 48 of the first flange 36 in the direction of the second thread-reinforced joint device 52 or the elastic flexible disk 52. The hollow-shaft segment 44 comprises a third flange 50, which is connected to the elastic joint device 52 by means of screws 54.

Figure 5:
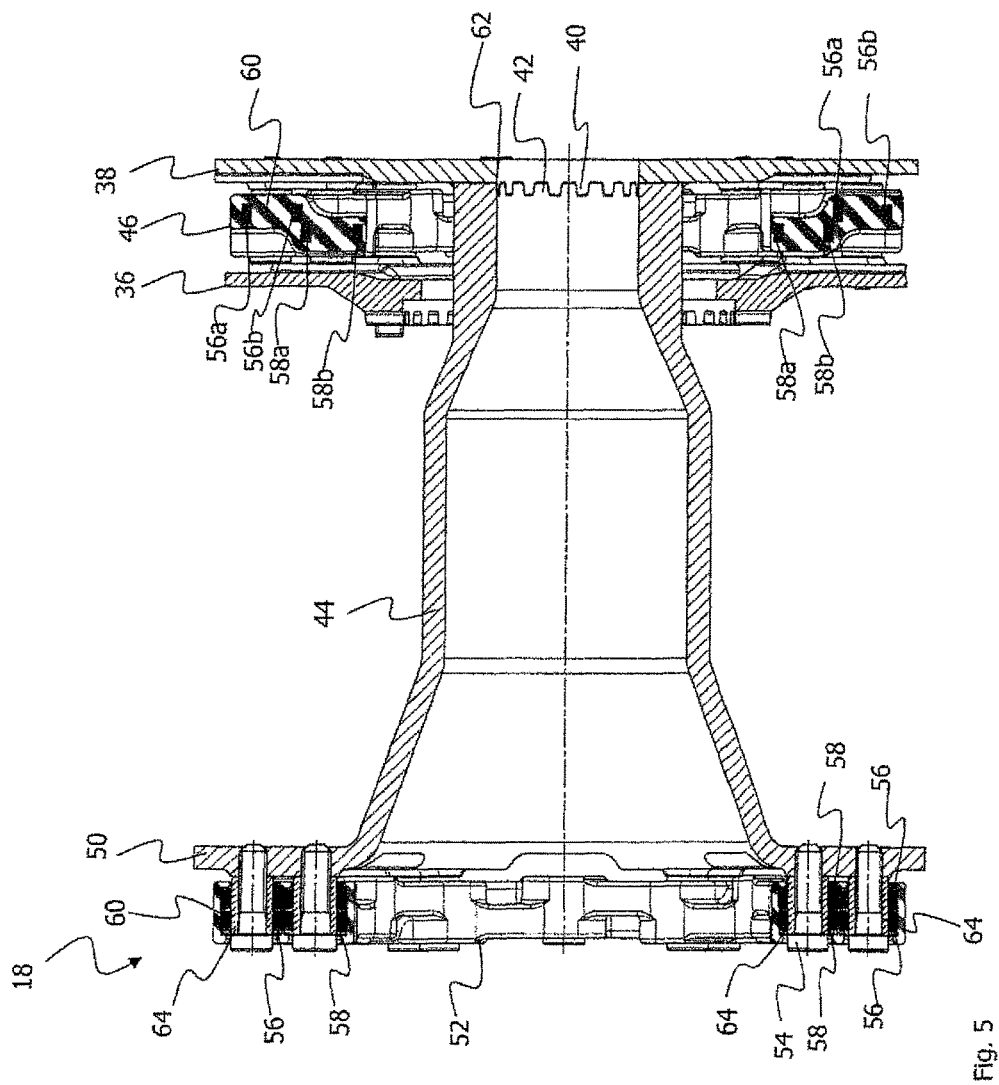
FIG. 5 shows a sectional view of the coupling device according to the invention.

FIG. 5 shows a sectional view of the coupling device 18.

The thread-reinforced joint device or the flexible disk 46 is provided between the first flange 36 and the second flange 38. The thread-reinforced joint device 46 comprises thread packets 56 and 58 of which in each case two strands 56a, 56b and 58a, 58b are identifiable in FIG. 5. The thread packets 56 and 58 are embedded in an elastomeric sheathing 60. The first thread-reinforced joint device 46 is used to transmit torque from the first flange 36 to the second flange 38.

The second flange 38 comprises an aperture 62. Embodied on the axial surface of the second flange 38 facing the hollow-shaft segment 44 is the gear tooth system 40 which engages in a corresponding gear tooth system 42 of the hollow-shaft segment 44. The third flange 50, which is connected to the second thread-reinforced joint device or the second flexible disk 52, is provided on the hollow-shaft segment 44. The thread-reinforced joint device 52 is connected to the third flange 50 by means of screws 54. To this end, the second thread-reinforced joint device 52 comprises coupling elements 64 by means of which the thread-reinforced joint device 52 can be connected to the third flange 50 in a torque-transmitting manner by means of the screws 54.

The second thread-reinforced joint device 52 also comprises thread packets 54 and 56 which are embedded in an elastic sheathing 60.

Figure 6:
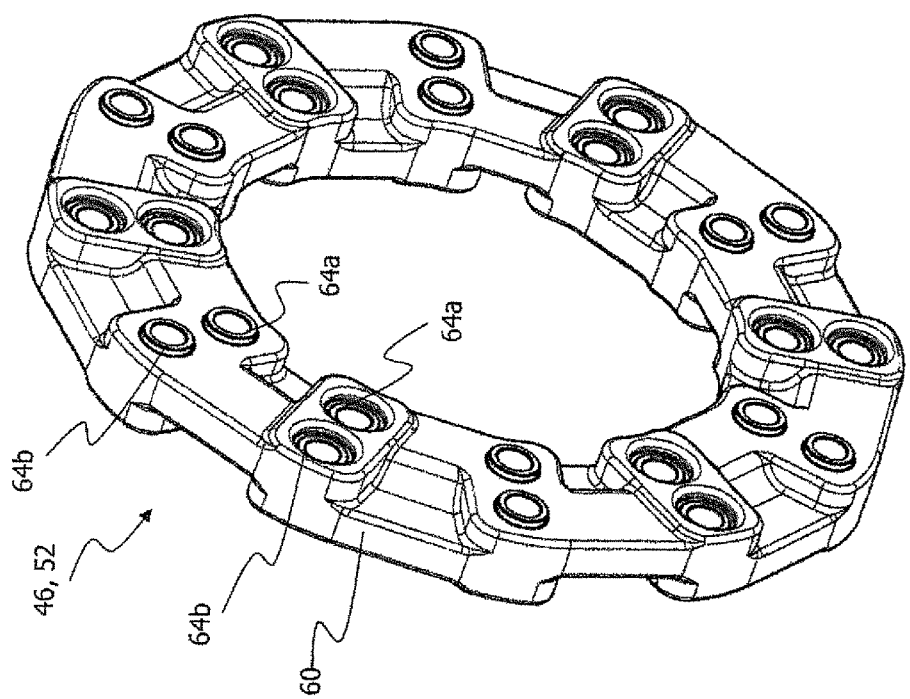
FIG. 6 shows a perspective view of a thread-reinforced joint device according to a first embodiment of the invention.

FIG. 6 shows a perspective view of a thread-reinforced joint device 46, 52 according to a first embodiment of the invention.

The thread-reinforced joint device 46, 52 according to the first embodiment can be used as the first and second elastic joint device 46, 52 in the coupling device 18. The elastic joint device 46, 52 comprises the elastic sheathing 60 in which the coupling elements 64 are embedded at least partially.

The flexible disk 46, 52 is embodied in two rows, i.e. the elastic joint device 46, 52 comprises two groups of coupling elements 64a and 64b arranged offset with respect to one another in the radial direction around the circumference of the elastic joint device 46, 52. Each of coupling elements 64a and 64b is used to couple the thread-reinforced joint devices 46, 52 to one of the flanges 36, 38, 50 or the rail vehicle wheel 12.

FIG. 7 shows a further perspective view of the thread-reinforced joint device 46, 52. The thread-reinforced joint device 46, 52 comprises a first group of coupling elements 64a and a second group of coupling elements 64b. The coupling elements 64a are arranged on a first radius and the coupling elements 64b are arranged on a second radius.

FIG. 8 shows a front view of the elastic joint device 46, 52 with the coupling elements 64a of the first group and the coupling elements 64b of the second group. The coupling elements 64a all lie on a first radius R1 about the center axis M of the elastic joint device 46, 52. The coupling elements 64b in turn all lie on a second radius R2 about the center axis M. The bushing-shaped coupling elements 64a and 64b are consequently arranged offset with respect to one another in the radial direction by the distance R2-R1. The coupling elements 64a and 64b are in alignment in the radial direction. In the circumferential direction, the coupling elements 64a and 64b are provided alternately with two types of shoulder elements 66, 68. The coupling elements 64a and 64b are partly provided with disk-shaped shoulder elements 66 while another part of the coupling elements 64a and 64b is provided with collar-shaped shoulder elements 68. The coupling elements 64a, 64b with the disk-shaped shoulder elements 66 and the coupling elements 64a, 64b with the collar-shaped shoulder elements 68 are arranged offset with respect to one another by 30° in the circumferential direction. The center axes $MK_1$ of the coupling elements 64a of the first group are arranged on the first radius R1 and the center axes $MK_2$ of the coupling elements 64b of the second group are arranged on the second radius R2.

FIG. 9 shows a sectional view along the line of intersection IX-IX in FIG. 8.

FIG. 9 identifies the coupling elements 64a and 64b which are encircled by the thread packets 56 and 58. The thread packets 56 and 58 are axially secured in the direction of the center axis M on their left side with disk-shaped shoulder elements 66 and in the direction of the center axis M on the right side of the joint device 46, 52 with shoulder elements 68 with an L-shaped cross section. The radial ends of the disk-shaped shoulder elements 66 are partially surrounded by the elastic sheathing 58.

A further shoulder element 70 is provided between the thread packets 56 or 58, wherein said shoulder element separates the thread-packet pairs 56 and 58 from one another. The axial ends of the coupling elements 64a and 64b, which are provided with the disk-shaped shoulder elements 66, serve as a point of application or contact point for the screw heads of the screws 54 (see FIG. 5).

FIG. 10 shows a front view of the thread-reinforced joint device 46, 52. The top view in FIG. 10 to a large extent corresponds to the top view of the thread-reinforced joint device 46, 52 in FIG. 8. Only the line of intersection XI-XI in FIG. 10 has a different course than the line of intersection IX-IX in FIG. 8.

FIG. 11 shows a sectional view along the line of intersection XI-XI in FIG. 10.

FIG. 11 identifies the thread packets 56 which encircle the coupling elements 64a of the first group. The thread packets 58 encircle the coupling elements 64b of the second group. The thread packets 58, which form a second group of thread packets, extend offset with respect to one another in the region between the coupling elements 64a and 64b in the direction of the center axis M of the thread-reinforced joint device 64, 52. Consequently, the thread packets 56 and the thread packets 58 are not only radially offset with respect to one another but are also offset in the direction of the center axis M. This can also be identified from the indentations V in the elastic body 60. The indentations V each lie in the region between the coupling elements 64a and 64b. The depth of the indentations V in the elastic body 60 substantially corresponds to the extension of the thread-reinforced joint device 46, 52 in the direction of the center axis M minus the cross section of a thread packet 56, 58 and the necessary sheathing of the thread packet by the elastic body 60.

Figure 12:
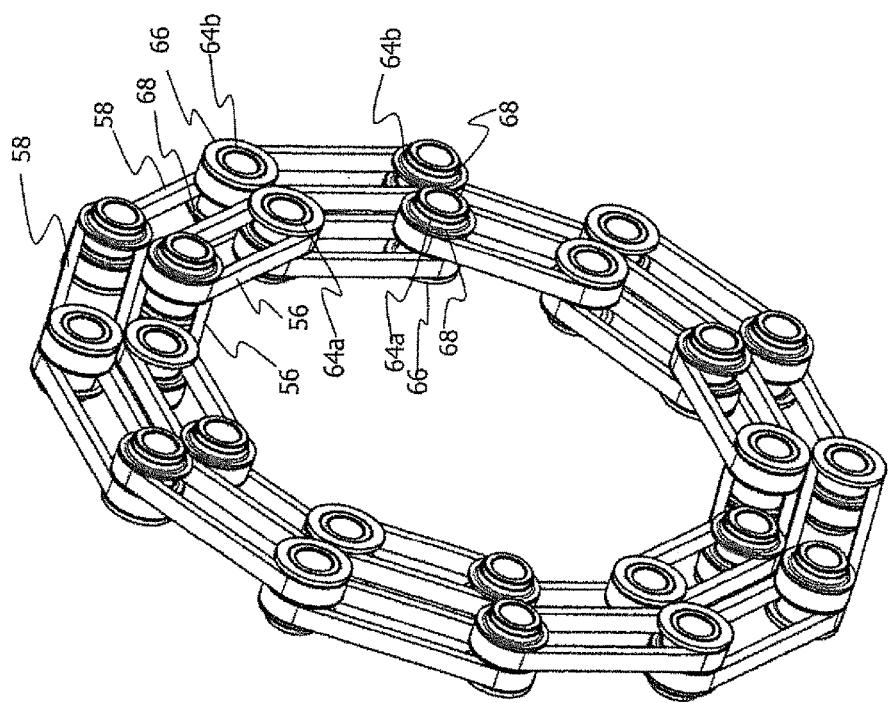
FIG. 12 shows a perspective view of a basic body of the thread-reinforced joint device according to the first embodiment of the invention.

FIG. 12 shows a perspective view of the basic body of the elastic joint device 46, 52. Accordingly, the subsequent figures show the basic body of the elastic joint devices without the elastic sheathing 60.

FIG. 12 identifies the clip-shaped thread packets 56 and 58 in each case encircling a coupling element 64a, 64b in pairs. In the circumferential direction the coupling elements 64a and 64b are provided alternately with the disk-shaped shoulder elements 66 and the shoulder elements 68 with an L-shaped cross section. In addition, one of the axial ends of each of the coupling elements 64a and 64b is provided with the disk-shaped shoulder elements 66 and in each case the other axial end with a shoulder element 68 with an L-shaped cross section. The coupling elements 64a of the first group are each encircled in pairs by the thread packets 56 which are alternately subjected to tensile and compressive stress. The thread packets 56 can be assigned to a first group. Together with the coupling elements 64a of the first group, the thread packets 56 of the first group form a first torque transmission chain. The coupling elements 64b of the second group are each encircled in pairs by the thread packets 58, wherein in each case one of the thread packets 58 is subjected to tensile stress and the other to compressive stress. The thread packets 58 are to be assigned to a second group and, together with the coupling elements 64b, form a second torque transmission chain.

In other words, the thread packets 56 are arranged in a ring shape and coupled to one another in a torque-transmitting manner by the coupling elements 64a. The same applies to the thread packets 58, which are arranged in a ring shape and coupled in a torque transmitting manner by the coupling elements 64b.

Moreover, it is identifiable in FIG. 12 that the thread packets 56 and 58 each extends offset with respect to one another in the axial direction and encircles the coupling elements 64a and 64b assigned thereto.

FIG. 13 shows a front view of the basic body of the elastic joint device 46, 52.

The thread packets 56 lie radially inside the thread packets 58, i.e. the ring formed by the thread packets 58 encircles the ring formed by the thread packets 56. In the circumferential direction, the thread packets 56 and 58 are secured alternately on each axial side of the elastic joint body 46, 52 once with disk-shaped shoulder elements 66 and once with collar elements 68 with an L-shaped cross section to the coupling elements 64a and 64b in the axial direction.

FIG. 14 shows a sectional view along the line of intersection XIV-XIV in FIG. 13.

FIG. 14 in turn identifies coupling elements 64a and 64b encircled by two thread packets 56 or 58. The axial ends of the coupling elements 64a and 64b are provided alternately with disc-shaped shoulder elements 66 and collar elements 68 with an L-shaped cross section.

Figure 15:
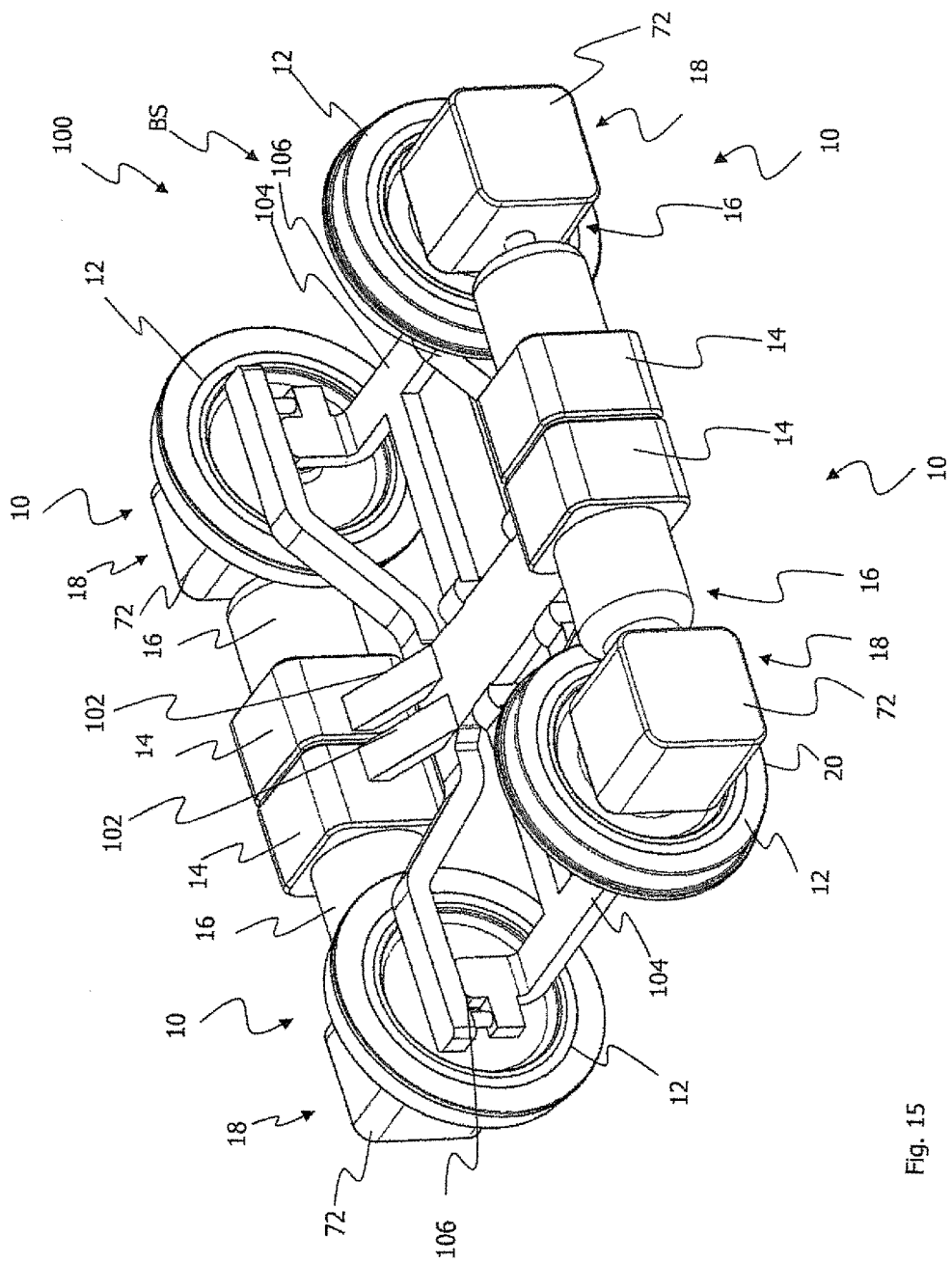
FIG. 15 shows the perspective view in FIG. 1 with housings arranged on the gear units.

FIG. 15 shows a perspective view extensively corresponding to the view in FIG. 1. The gear unit 16 and the coupling devices 18 are received in housings 72. Elements (not shown) for holding or mounting the coupling devices 18 can be provided or embodied in the housings 72. The housings 72 span the region between the motor 14 and the wheel 12. The shape of the housings 72 is selected such that the housing 72 or its inside walls (not shown) have the shortest possible distance to the gear unit 16 and the coupling device 18.

Figure 16:
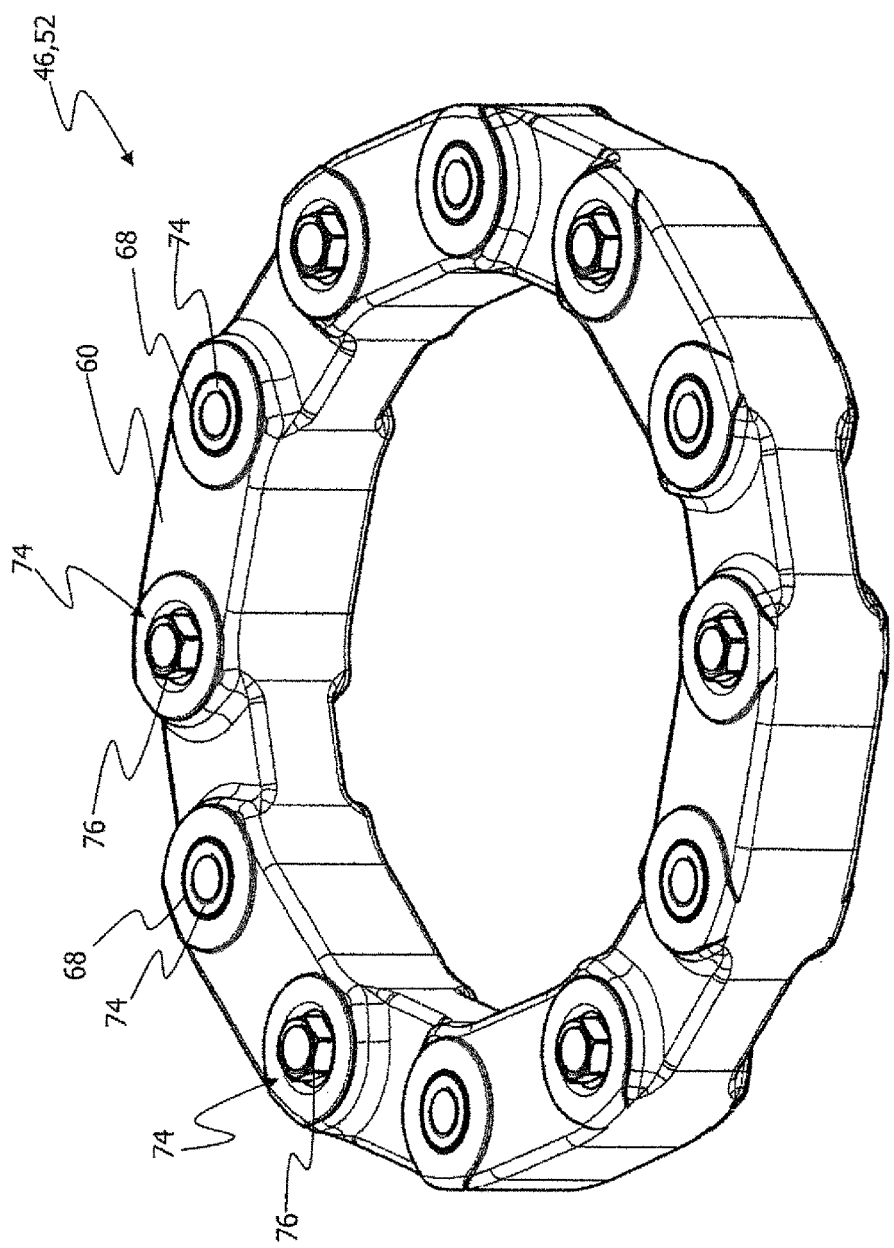
FIG. 16 shows a perspective view of a thread-reinforced joint device according to a second embodiment of the invention.

FIG. 16 shows a perspective view of a thread-reinforced joint device 46, 52 according to a second embodiment of the invention.

The thread-reinforced joint device 46 according to this embodiment comprises coupling elements 74, which are at least partially embedded in an elastic body 60.

The coupling elements 74 have a screw head 76 at their axial ends. According to this embodiment, the screw head 76 is embodied in the form of a hexagon. A shoulder element 68 is provided at the axial end of the coupling elements 74 opposite to the screw head 76. In the circumferential direction of the thread-reinforced joint device 46, it is in each case possible to identify alternately the screw head 76 and the axial end of the coupling element 74 with the shoulder element 68 opposite to the screw head 76.

FIG. 17 shows a top view of the thread-reinforced joint device 46.

FIG. 17 shows the coupling elements 74 with their screw head 76. As is clearly identifiable in FIG. 17, the screw head 76 is a hexagon.

FIG. 18 shows a sectional view along the line of intersection XVIII-XVIII in FIG. 17.

In addition to the screw head 76, the coupling elements 74 also have a shoulder segment 78 acting as a shoulder element. The shoulder segment 78 is used to secure the thread packets 56a, 56b and 58 axially on the coupling element 74. To this end, the shoulder segment 78 interacts with the shoulder element 68. The shoulder element 68 is provided on the axial end of the coupling element 74 opposite the shoulder segment 78. The shoulder segment 78 and the shoulder element 68 hold the thread packets 56a, 56b and 58 in their predetermined position on the coupling element 74. The screw head 76 and the shoulder segment 78 are embodied in one piece with the coupling element 76.

The coupling elements 74 have a through opening O. The inside of the aperture O is provided with a screw-thread in which the mounting screws (not shown) can be screwed in order to mount the thread-reinforced joint device 46, 52 on a flange.

During the operation of the thread-reinforced joint device 46, 52, the thread packets 56a and 56b are to a large extent subjected to compressive stress. During the operation of the thread-reinforced joint device 46, the thread packet 58 with a larger cross section is mainly subjected to tensile forces.

Figure 19:
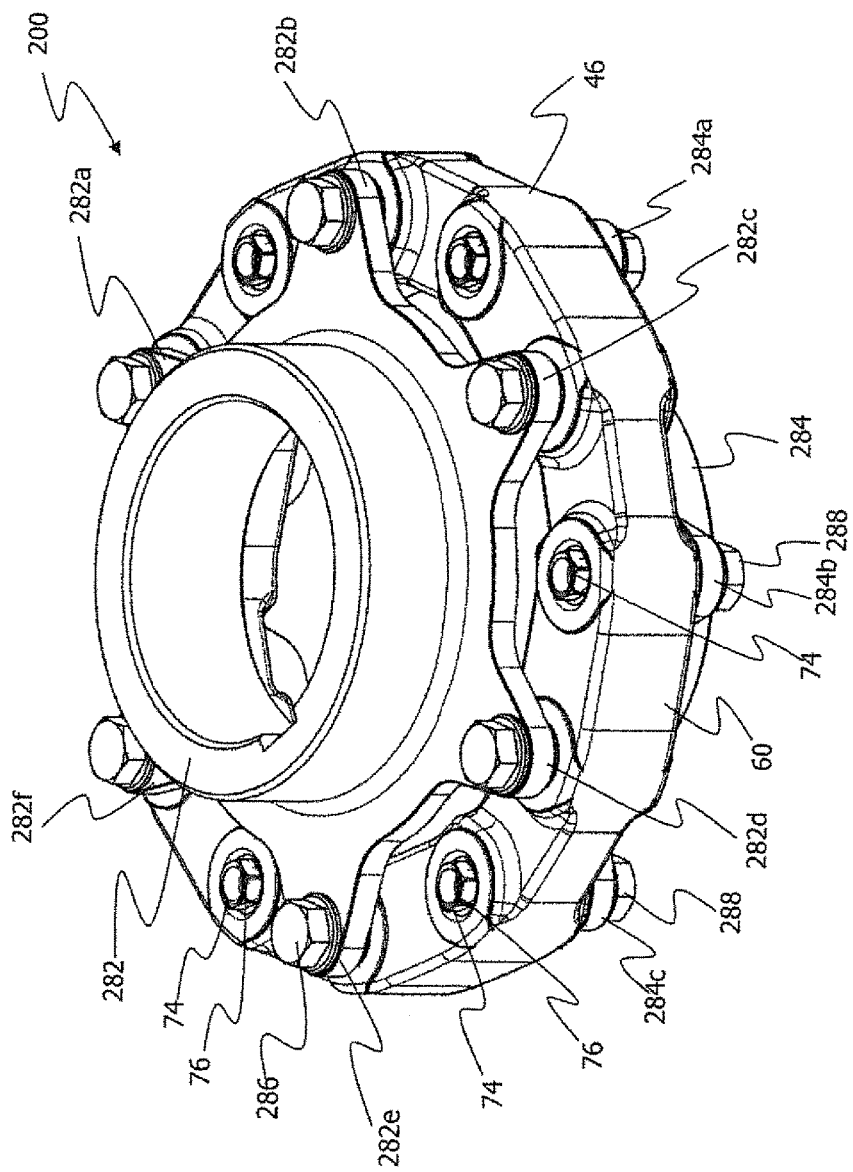
FIG. 19 shows a perspective view of a coupling device with a thread-reinforced joint device according to the second embodiment of the invention.

FIG. 19 shows a coupling device 200 with the thread-reinforced joint device 46 according to the second embodiment.

The coupling device 200 comprises a first flange 282 and a second flange 284 connected to one another by the thread-reinforced joint device 46.

The first flange 282 comprises flange arms 282a to 282e. The second flange 284 comprises flange arms 284a to 284c. The flange arms 282a to 282e of the first flange 282 are connected to the thread-reinforced joint device 46 by means of screws 286. Similarly, the flange arms 284a to 284c of the second flange 284 are screwed to the thread-reinforced joint device 46 by means of screws 288. Here, the screws 286 and 288 are screwed into the coupling elements 74 with the screw-thread 80 (FIG. 18). Here, the screw head 76 is used to counterhold the coupling element 74 while the screws 286, 288 are screwed in. While the screws 86 and 88 are being screwed into the thread-reinforced joint device 46, the coupling element 74 is counterheld by means of a screw head 76 with the aid of a wrench so that no torque is transmitted to the thread-reinforced joint device 46.

FIG. 20 shows a top view of the coupling device 200 in which the first flange 282 with its flange arms 282a to 282f can be identified. The flange arms 282a to 282f are connected to the thread-reinforced joint device 46 by the screws 286, i.e. the screws 286 were screwed into the coupling element 74 with its screw-thread 80. The same applies to the screws 288.

FIG. 21 shows a sectional view along the line of intersection XXI-XXI in FIG. 20.

The screws 286 and 288 were screwed into the aperture O of the coupling element 74 with the screw-thread 80. It is further identifiable in FIG. 21 that the shoulder segment 78 is provided on the axial end of the coupling element 74 on which the screw head 76 is also located. While the screws 286 and 288 are being screwed in, the coupling elements 74 are held by means of the screw head 76 thus avoiding torque transmission to the coupling elements 74. This should in particular avoid torque transmission to the thread packets 56a, 56b and 58 and the elastic body 60. The screws 286 and 288 with their screw heads are located on the side of the flanges 282 and 284 facing away from the thread-reinforced joint device 46.

Figure 22:
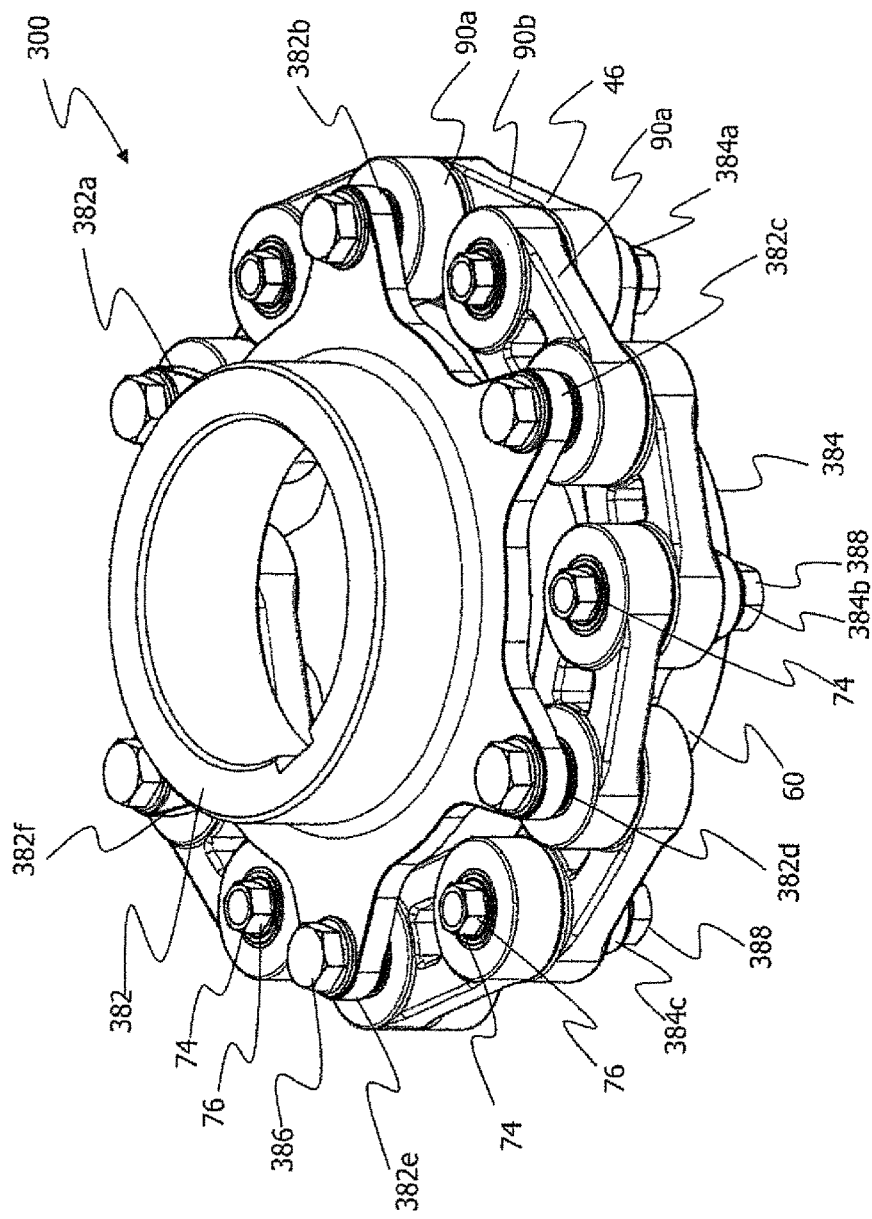
FIG. 22 shows a coupling device with a thread-reinforced joint device according to the second embodiment of the invention.

FIG. 22 shows a coupling device 300 extensively corresponding to the coupling device 200 described with reference to FIGS. 19 to 21.

The actual differences between this embodiment and the above described embodiment consist in the elastic joint device 46, which, according to this embodiment, comprises a plurality of coupling elements 90a and 90b with elastic bodies 60. The coupling elements 90a and 90b are each screwed to the flanges 382 and 384 or their flange arms 382a to 382e and 384a to 384c by a screw 386, 388. To this end, the coupling elements 74 with a screw head 76 are provided on the coupling elements 90a and 90b. As in the above-described embodiment, the screw head 76 in the form of a hexagon is used to counterhold the coupling elements 74 while the screws 386 and 388 are screwed into the coupling elements 74 so that no torque is transmitted to the coupling elements 90a and 90b.

FIG. 23 shows a top view of the coupling device 300 in which the first flange 384 with the screws 386 can be identified. The screws 386 are screwed to the coupling elements 74 of the thread-reinforced joint device 46. The same applies to the screws 388.

FIG. 24 shows a sectional view along the line of intersection XXIV-XXIV in FIG. 23.

In FIG. 24, it is possible to identify the coupling elements 90a and 90b which together form the thread-reinforced joint device 46. The coupling elements 90a and 90b each have an elastic body 60. A thread packet 56 with shoulder elements 68 is embedded in the elastic body 60 each coupling element 90a and 90b. The shoulder elements 68 are used to secure the thread packet 56 to a bushing 92. The shoulder elements 68 have an L-shaped cross section and their tube segment lies on the bushing 92. The shoulder elements 68 can be pressed onto the bushing 92.

Each coupling element 74 connects two coupling elements 90a and 90b to one another. Accordingly, each coupling element 74 connects two bushings 92 of the coupling elements 90a and 90b. The coupling elements 74 in turn have a central aperture O in which a screw-thread 80 is provided. The screws 86 and 88 can be screwed into the screw-thread 80 of the coupling elements 74. This enables the thread-reinforced joint device 46 to be connected to the flanges 382 and 384.

Figure 25:
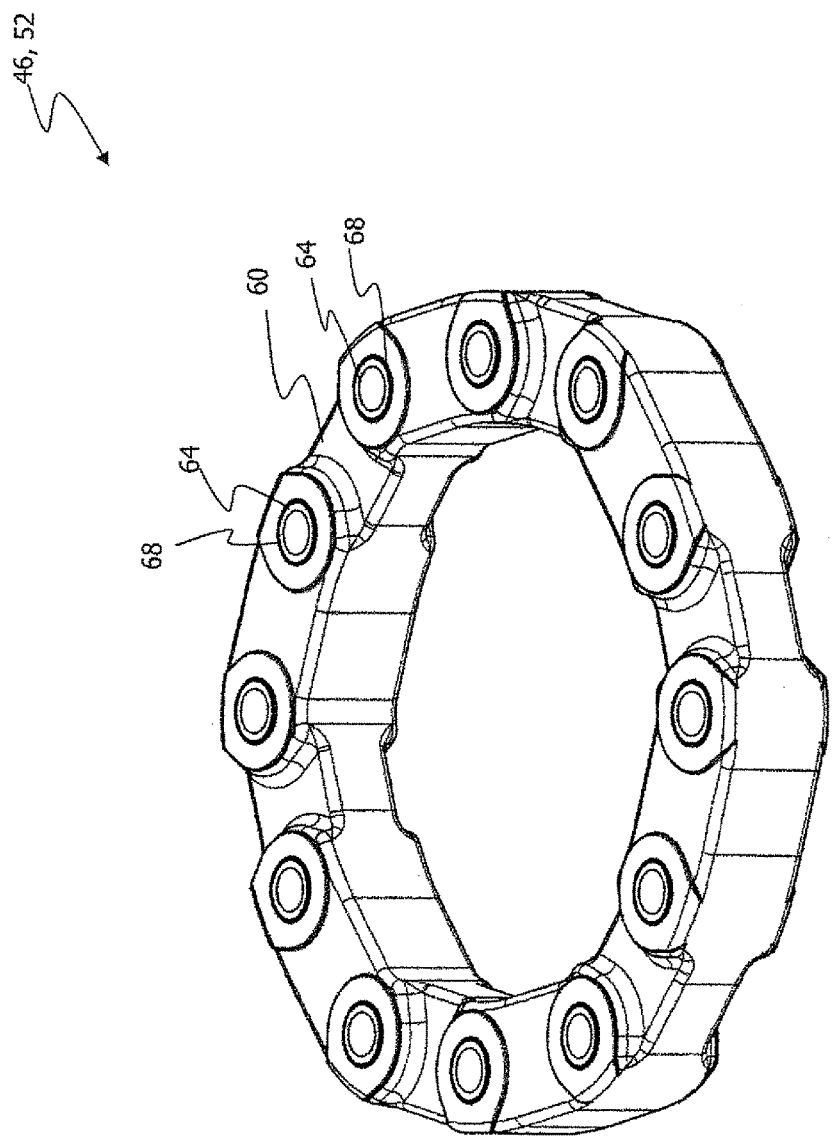
FIG. 25 shows a perspective view of a thread-reinforced joint device according to a third embodiment of the invention.

FIG. 25 shows a perspective view of a thread-reinforced joint device according to a third embodiment of the invention.

The thread-reinforced joint device 46 comprises an elastic body 60 in which the coupling elements 64 and the shoulder elements 68 on the coupling elements 64 are at least partially embedded.

Figure 26:
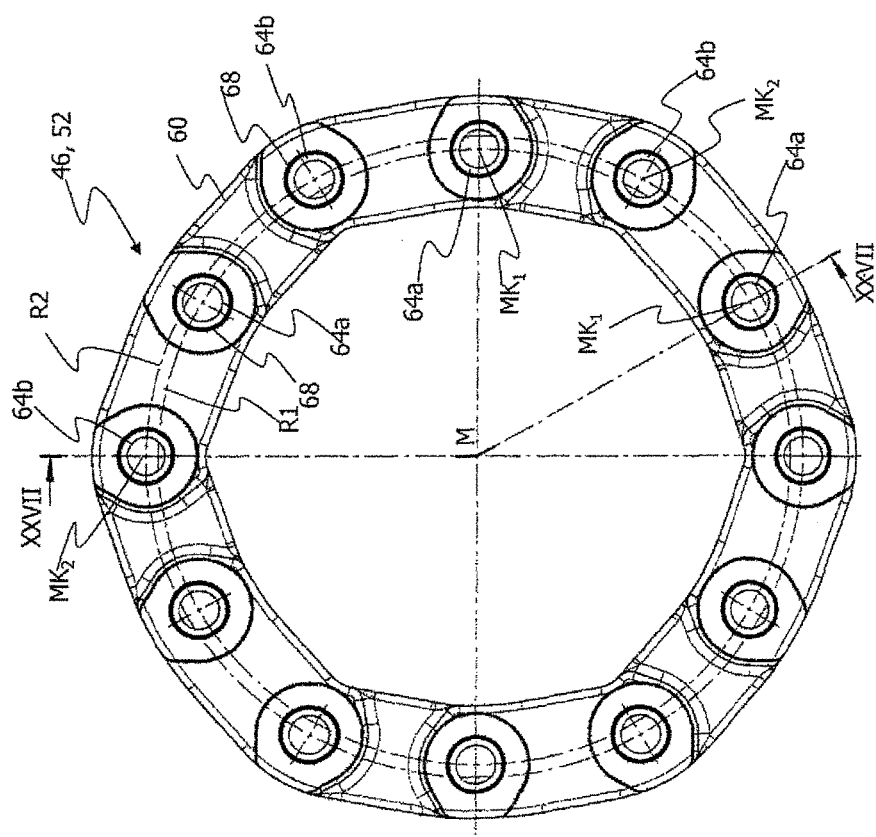
FIG. 26 shows a top view of the thread-reinforced joint device according to the third embodiment of the invention.

FIG. 26 shows a top view of the thread-reinforced joint device 46.

Figure 27:
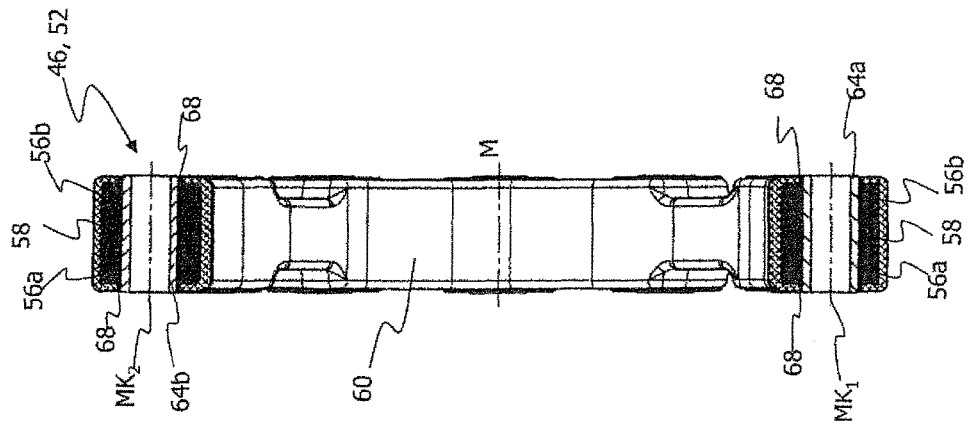
FIG. 27 shows a sectional view along the line of intersection XXVII-XXVII in FIG. 26.

The coupling elements 64 can be subdivided into a first group of coupling elements 64a and a second group of coupling elements 64b. The first group of coupling elements 64a is arranged with its center axes $MK_1$ on a first radius R1. The second group of the coupling elements 64b with its center axes $MK_2$ is arranged on a second radius R2. Hence, the coupling elements 64a of the first group and the coupling elements 64b of the second group are offset with respect to one another by the amount R2-R1 in the radial direction. The coupling elements 64a and the coupling elements 64b are arranged alternately in the circumferential direction of the thread-reinforced joint device 46. The coupling elements 64a of the first group and the coupling elements 64b of the second group are each coupled to one another by a thread packet (FIG. 27). This offset in the radial direction of the coupling elements 64a and 64b, causes the thread packets 56a, 56b and 58 (FIG. 27) to extend obliquely between the coupling elements 64a and 64b to be connected. As a result, during the operation of the thread-reinforced joint device 46, the thread packets 56a, 56b and 58 have a tangential alignment. The tangential alignment of the thread packets 56a, 56b and 58 enables a characteristic curve with a soft zero passage. Moreover, the arrangement of the coupling elements 64a on the radius R1 and the coupling elements 64b ob the radius R2 enables greater radial deflection. In this case, the deflection is permitted in the magnitude of the value R2-R1. Accordingly, the radial deflection is within the range of the difference between the radius R2 and the radius R1.

FIG. 27 shows a sectional view along the line of intersection XXVI-XXVI in FIG. 26.

The coupling elements 64a and 64b are encircled by thread packets 56a, 56b and 58. The thread packets 56a, 56b and 58 are held on the coupling elements 64a, 64b by means of the shoulder elements 68. The shoulder elements 68 have an L-shaped cross section and have a tube segment lying on the coupling elements 64a and 64b and a segment extending in the radial direction. The encircling packets 56a and 56b lie on the segment of the shoulder elements 68 extending in the radial direction.

All the above-described embodiments of the thread-reinforced joint devices 46, 52 can be used in a coupling device 18 according to FIGS. 1 to 6. The individual aspects of the above-described embodiments of thread-reinforced joint devices 46, 52 can also be provided together in one single thread-reinforced joint device 46, 52.

The invention claimed is:

1. A thread-reinforced joint device for a coupling device of a vehicle drive, comprising:
a plurality of coupling elements configured to allow the thread-reinforced joint device to be adapted to different mounting interfaces of a coupling device;
at least one thread packet configured to couple adjacent ones of the coupling elements for transmission;
a support device arranged on at least one of the adjacent coupling elements and configured to axially guide the at least one thread packet; and
at least one elastic body having at least partially embedded therein the at least one thread packet and the adjacent coupling elements,
wherein a first group of the coupling elements is arranged on a first radius and a second group of the coupling elements is arranged on a second radius, said first and second radii differing from one another.

2. The thread-reinforced joint device of claim 1, wherein the vehicle drive is part of a low-platform vehicle.

3. The thread-reinforced joint device of claim 1, wherein the at least one of the adjacent coupling elements includes a screw thread.

4. The thread-reinforced joint device of claim 1, wherein at least one of the adjacent coupling elements includes a segment with a predetermined screw head.

5. The thread-reinforced joint device of claim 1, wherein the at least one of the adjacent coupling elements includes a segment to form a shoulder element.

6. The thread-reinforced joint device of claim 1, further comprising a bushing configured to receive the at least one of the adjacent coupling elements.

7. The thread-reinforced joint device of claim 1, wherein the coupling elements of the first group and the coupling elements of the second group are arranged alternately in a circumferential direction of the thread-reinforced joint device.

8. The thread-reinforced joint device of claim 1, wherein the coupling elements of the first group and the coupling elements of the second group are arranged in alignment or offset with respect to one another in a radial direction.

9. The thread-reinforced joint device of claim 1, wherein one of the adjacent coupling elements is a member of the first group of the coupling elements and the other one of the adjacent coupling elements is a member of the second group of the coupling elements.

10. The thread-reinforced joint device of claim 1, wherein the coupling elements of the first group are connected to one another by a first group of thread packets and the coupling elements of the second group are connected to one another by a second group of thread packets.

11. The thread-reinforced joint device of claim 10, wherein the first and second groups of thread packets are clip-shaped.

12. The thread-reinforced joint device of claim 1, further comprising a plurality of said elastic body and a plurality of said thread packet, each of the elastic bodies having received therein a corresponding one of the thread packets.

13. The thread-reinforced joint device of claim 12, wherein the elastic bodies are coupled to one another by at least one of the coupling elements.

14. A coupling device for a vehicle drive, comprising:
a first flange configured for coupling to a gear unit;
a shaft segment extending through the at least one first flange;
a first thread-reinforced joint device comprising a plurality of coupling elements configured to allow the thread-reinforced joint device to be adapted to different mounting interfaces of a coupling device, at least one thread packet configured to couple adjacent ones of the coupling elements for transmission, a support device arranged on at least one of the adjacent coupling elements and configured to axially guide the at least one thread packet, and at least one elastic body having at least partially embedded therein the at least one thread packet and the adjacent coupling elements, wherein a first group of the coupling elements is arranged on a first radius and a second group of the coupling elements is arranged on a second radius, said first and second radii differing from one another;

a second flange coupled to the first flange by the first thread-reinforced joint device;

a third flange configured for coupling to a wheel of the vehicle drive, said third flange being coupled to the second flange via the shaft segment; and a second thread-reinforced joint device arranged on the third flange.

15. The coupling device of claim 14, wherein the vehicle drive is part of a low-platform vehicle.

16. The coupling device of claim 14, wherein the shaft segment is a hollow-shaft segment.

17. The coupling device of claim 14, wherein the first flange includes an aperture, said shaft segment extending through the aperture of the first flange.

18. The coupling device of claim 14, wherein the shaft segment includes a gear tooth system engaging in a corresponding gear tooth system on the second flange.

19. The coupling device of claim 14, wherein the third flange is formed in one piece with the shaft segment.

20. The coupling device of claim 14, wherein at least one member selected from the group consisting of the first thread-reinforced joint device and the second thread-reinforced joint device is constructed to include a plurality of coupling elements configured to allow the thread-reinforced joint device to be adapted to different mounting interfaces of a coupling device, at least one thread packet configured to couple adjacent ones of the coupling elements for transmission, a support device arranged on at least one of the adjacent coupling elements and configured to axially guide the at least one thread packet, and at least one elastic body having at least partially embedded therein the at least one thread packet and the adjacent coupling elements.

21. A drive arrangement for a vehicle, comprising:

a gear unit operably connected to at least one vehicle wheel of the vehicle;

a motor coupled to the gear unit; and a coupling device arranged between the gear unit and the at least one vehicle wheel, said coupling device including a first flange configured for coupling to the gear unit, a shaft segment extending through the at least one first flange, a first thread-reinforced joint device, a second flange coupled to the first flange by the first thread-reinforced joint device, a third flange configured for coupling to a wheel of the vehicle drive, said third flange being coupled to the second flange via the shaft segment, and a second thread-reinforced joint device arranged on the third flange, wherein at least one of the first and second thread-reinforced joint devices includes a plurality of coupling elements configured to allow the thread-reinforced joint device to be adapted to different mounting interfaces of a coupling device, at least one thread packet configured to couple adjacent ones of the coupling elements for transmission, a support device arranged on at least one of the adjacent coupling elements and configured to axially guide the at least one thread packet, and at least one elastic body having at least partially embedded therein the at least one thread packet and the adjacent coupling elements, wherein a first group of the coupling elements is arranged on a first radius and a second group of the coupling elements is arranged on a second radius, said first and second radii differing from one another.

22. The drive arrangement of claim 21, wherein the vehicle is part of a low-platform vehicle.

23. The drive arrangement of claim 21, wherein the second thread-reinforced joint device of the coupling device is coupled to the at least one vehicle wheel.

24. The drive arrangement of claim 21, wherein the gear unit includes a shaft segment, said first flange of the coupling device including a gear tooth system for coupling with a gear tooth system of the shaft segment of the gear unit.

25. A low-platform vehicle, comprising a drive arrangement, said drive arrangement including a gear unit operably connected to at least one vehicle wheel of the vehicle, a motor coupled to the gear unit, and a coupling device arranged between the gear unit and the at least one vehicle wheel, said coupling device including a first flange configured for coupling to the gear unit, a shaft segment extending through the at least one first flange, a first thread-reinforced joint device, a second flange coupled to the first flange by the first thread-reinforced joint device, a third flange configured for coupling to a wheel of the vehicle drive, said third flange being coupled to the second flange via the shaft segment, and a second thread-reinforced joint device arranged on the third flange, wherein at least one of the first and second thread-reinforced joint devices includes a plurality of coupling elements configured to allow the thread-reinforced joint device to be adapted to different mounting interfaces of a coupling device, at least one thread packet configured to couple adjacent ones of the coupling elements for transmission, a support device arranged on at least one of the adjacent coupling elements and configured to axially guide the at least one thread packet, and at least one elastic body having at least partially embedded therein the at least one thread packet and the adjacent coupling elements, wherein a first group of the coupling elements is arranged on a first radius and a second group of the coupling elements is arranged on a second radius, said first and second radii differing from one another.

* * * * *